US009711296B2

(12) United States Patent
Bandaru et al.

(10) Patent No.: US 9,711,296 B2
(45) Date of Patent: Jul. 18, 2017

(54) ENERGY STORAGE METHOD AND SYSTEM USING DEFECT-ENGINEERED NANOSTRUCTURES

(75) Inventors: Prabhakar R. Bandaru, San Diego, CA (US); Mark Hoefer, Malibu, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 876 days.

(21) Appl. No.: 13/883,258

(22) PCT Filed: Nov. 2, 2011

(86) PCT No.: PCT/US2011/059024
§ 371 (c)(1),
(2), (4) Date: Jul. 14, 2013

(87) PCT Pub. No.: WO2012/061534
PCT Pub. Date: May 10, 2012

(65) Prior Publication Data
US 2013/0279076 A1 Oct. 24, 2013

Related U.S. Application Data

(60) Provisional application No. 61/409,409, filed on Nov. 2, 2010.

(51) Int. Cl.
*H01L 21/00* (2006.01)
*H01G 11/04* (2013.01)
(Continued)

(52) U.S. Cl.
CPC .............. *H01G 11/04* (2013.01); *B82Y 30/00* (2013.01); *B82Y 40/00* (2013.01);
(Continued)

(58) Field of Classification Search
CPC ...... B82Y 40/00; B82Y 30/00; H01G 9/0029; H01G 11/04; Y02E 60/13
See application file for complete search history.

(56) References Cited

U.S. PATENT DOCUMENTS

2002/0136681 A1* 9/2002 Smalley ................. B01J 19/081
423/447.2
2005/0036905 A1 2/2005 Gokturk
(Continued)

FOREIGN PATENT DOCUMENTS

WO 2009041076 4/2009

OTHER PUBLICATIONS

Banks, C. et al, "Electrocatalysis at graphite and carbon nanotube modified electrodes: edge-plane sites and tube ends are the reactive sites", Chemical Communications 7, Aug. 27, 2004, pp. 829-841.
(Continued)

*Primary Examiner* — Richard Booth
(74) *Attorney, Agent, or Firm* — Perkins Coie LLP

(57) ABSTRACT

An energy storage device includes a first electrode and a second electrode comprising nanostructures. The nanostructures comprise defects that increase charge storage capabilities of the energy storage device. A method of fabricating an energy storage device includes producing a nanomaterial comprising nanostructures and generating defects in the nanomaterial using an electrophilic or nucleophilic additive for increasing charge storage capability of the nanomaterial.

19 Claims, 24 Drawing Sheets

(51) Int. Cl.
| | |
|---|---|
| H01G 11/24 | (2013.01) |
| H01G 11/30 | (2013.01) |
| C01B 31/02 | (2006.01) |
| B82Y 30/00 | (2011.01) |
| H01G 9/00 | (2006.01) |
| B82Y 40/00 | (2011.01) |

(52) U.S. Cl.
CPC ...... *C01B 31/0253* (2013.01); *C01B 31/0273* (2013.01); *H01G 9/0029* (2013.01); *H01G 11/24* (2013.01); *H01G 11/30* (2013.01); *Y02E 60/13* (2013.01); *Y10T 29/417* (2015.01)

(56) References Cited

U.S. PATENT DOCUMENTS

| | | | |
|---|---|---|---|
| 2006/0105523 A1* | 5/2006 | Afzali-Ardakani .... | B82Y 10/00 438/257 |
| 2009/0038681 A1 | 2/2009 | Trancik et al. | |

OTHER PUBLICATIONS

Barbieri, O. et al, "Capacitance limits of high surface area activated carbons for double layer capacitors", Carbon 43, Jan. 7, 2005, pp. 1303-1310.
Bard, A. et al, "Chapter 6—Potential Sweep Methods," Electrochemical Methods: fundamentals and Applications, 2 ed., New York, 2001. 19 pages.
Brett, C. et al, "Electrochemistry: Principles, Methods, and Applications", Oxford University Press, 1993, 11 pages.
Chou, A. et al, "Demonstration of the importance of oxygenated species at the ends of carbon nanotubes for their favourable electrochemical properties", Chemical Communications 7, Jan. 13, 2005, pp. 842-844.
Conway, B. , "Transition from "Supercapacitor" to "Battery" Behavior in Electrochemical Energy Storage", Journal of the Electrochemical Society 138, Jun. 1991, pp. 1539-1548.
Elman, B. et al, "Structural characterization of ion-implanted graphite", Physical Review B 25, Mar. 15, 1982, pp. 4142-4156.
Emmenegger, C. et al, "Investigation of electrochemical double-layer (ECDL) capacitors electrodes based on carbon nanotubes and activated carbon materials", Journal of Power Sources 124, May 5, 2003, pp. 321-329.
Hoefer, M. et al., "Determination and enhancement of the capacitance contributions in carbon nanotube based electrode systems", Applied Physics Letters, 95, 2009, 3 pages.
International Search Report and Written Opinion for International Application No. PCT/US2011/059024, issued by Korean Intellectual Property Office, May 8, 2012, 8 Pages.
Kavan, L. et al, "Electrochemistry of Carbon Nanotubes", edited by A. Jorio, G. Dresselhaus, and M. S. Dresselhaus, 2008, pp. 567-603.
Konopka, S. et al, "Diffusion Coefficients of Ferri- and Ferrocyanide Ions in Aqueous Media, Using Twin-Electrode Thin-Layer Electrochemistry", Analytical Chemistry 42, Dec. 1970, pp. 1741-1746.
Kotz, R. et al, "Principles and applications of electrochemical capacitors", Electrochimica Acta 45, 2000, pp. 2483-2498.
Lu, W. et al, "High performance electrochemical capacitors from aligned carbon nanotube electrodes and ionic liquid electrolytes", Journal of Power Sources 189, Jan. 8, 2009, pp. 1270-1277.
Nahir, T. et al, "Measurement of the Rate of Adsorption of Electroactive Cytochrome c to Modified Gold Electrodes by Electrochemical Impedance Spectroscopy", American Chemical Society, May 29, 2002, pp. 5283-5286.
Nichols, J. et al, "Tailoring the Electrochemical Behavior of Multiwalled Carbon Nanotubes Through Argon and Hydrogen Ion Irradiation", Electrochemical and Solid-State Letters 11, Jan. 28, 2008, 5 pages.
Nichols, J. et al, "Artificial introduction of defects into vertically aligned multiwalled carbon nanotube ensembles: Application to electrochemical sensors", Journal of Applied Physics, Jul. 31, 2007, 7 pages.
Niessen, R., et al, "The Electrochemistry of Carbon Nanotubes", Journal of the Electrochemical Society 153, Jun. 5, 2006, 8 pages.
Niu, C., et al, "A Single-Step Process for Preparing Supercapacitor Electrodes from Carbon Nanotubes", Soft Nanoscience Letters, Jan. 24, 2011, 5 pages.
Peigney, A. et al, "Specific surface area of carbon nanotubes and bundles of carbon nanotubes", Carbon 39, Jun. 8, 2000, pp. 507-514.
Pharr, C. et al, "Infrared Spectroelectrochemical Analysis of Adsorbed Hexacyanoferrate Species Formed during Potential Cycling in the Ferrocyanide/Ferricyanide Redox Couple", Analytical Chemistry 69, Nov. 15, 1997, pp. 4673-4679.
Rao, A. et al, "Evidence for charge transfer in doped carbon nanotube bundles from Raman scattering", Nature 388, Jul. 17, 1997, 3 pages.
Robertson, J., "Diamond-like amorphous carbon", Materials Science and Engineering R 37, 2002, pp. 129-281.
Robinson, J. et al, "Role of Defects in Single-Walled Carbon Nanotube Chemical Sensors", Nanoletters 6, Jul. 25, 2006, pp. 1747-1751.
Tuinstra, F. et al, "Raman Spectrum of Graphite", Journal of Chemical Physics 53, Aug. 1, 1970, 6 pages.
Wang, K. et al, "Band-Gap Modulation in Single-Crystalline $Si_{1-x}Ge_x$ Nanowires", Nanoletters 6, Nov. 3, 2006, pp. 2043-2048.
Zhang, Y. et al, "Progess of electrochemical capacitor electrode materials: A review", International Journal of Hydrogen Energy 34, Apr. 29, 2009, pp. 4889-4899.

* cited by examiner

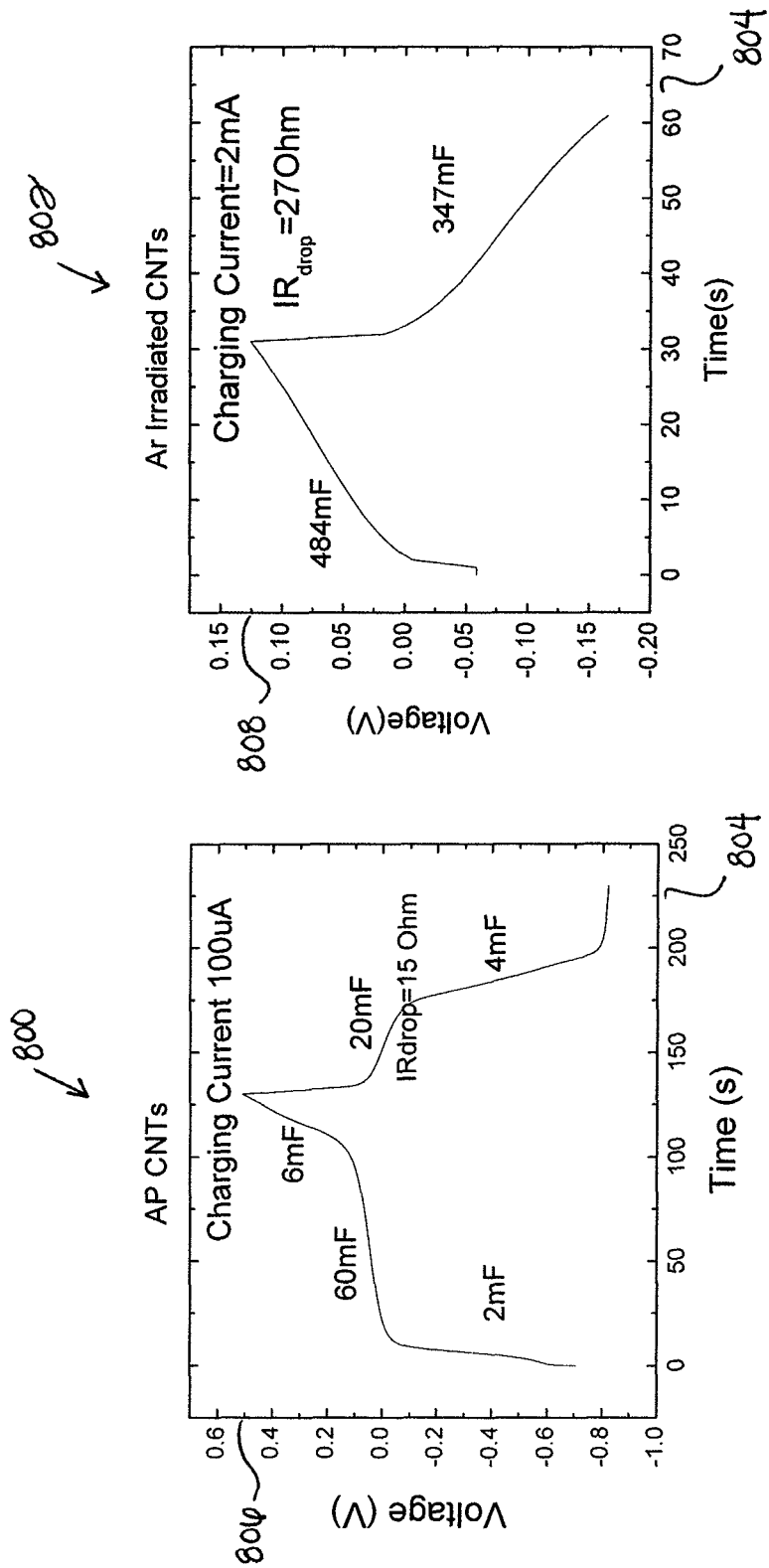

ENERGY STORAGE METHOD AND SYSTEM USING DEFECT-ENGINEERED NANOSTRUCTURES

CROSS-REFERENCE TO RELATED PATENT APPLICATIONS

This patent document is a 35 USC §371 National Stage application of International Application No. PCT/US2011/059024, entitled "ENERGY STORAGE METHOD AND SYSTEM USING DEFECT-ENGINEERED NANOSTRUCTURES," filed on Nov. 2, 2011 which claims the benefit of priority from U.S. Provisional Patent Application Ser. No. 61/409,409, entitled "ENHANCED CAPACITANCE IN CARBON NANOTUBE BASED ELECTRODE SYSTEMS FOR SUPERCAPACITORS," filed on Nov. 2, 2010. The disclosure of the before-mentioned applications are incorporated by reference as part of this patent document.

STATEMENT REGARDING FEDERALLY SPONSORED RESEARCH OR DEVELOPMENT

This invention was made with government support under grant No. ECS 0508514 awarded by the National Science Foundation. The government has certain rights in the invention.

BACKGROUND

This application relates to devices, techniques and material related to energy storage.

Various types of energy storage devices are available. Some example energy storage devices include chemical cells (e.g., alkaline cells, sometimes called batteries), capacitors, etc. While batteries have relatively large storage capacity, they may not be rechargeable or may take a relatively longer time to charge (e.g., several tens of minutes). Furthermore, rechargeable batteries are typically limited to less than 100 charge cycles, after which their charge holding capacity diminishes significantly. By contrast, electrostatic capacitors can be charged quickly (e.g., less than a minute) but typically have limited capacity. Carbon nanotubes (CNTs) have been proposed for electrodes in electrochemical capacitors (ECCs) or supercapacitors primarily due to the large surface area offered by CNTs and the abundance of reaction sites with the possibility of large charge storage capacity and capacitance (C). Consequently, in an electrolyte where electrochemical reactions can occur over a wide voltage range (V), large energy densities (W) per unit mass (m) can be achieved, where $$W = \frac{CV^2}{2m}.$$

While possessing superior power densities due to the capability of fast charge/discharge, presently CNT based ECCs have lower energy densities (1-10 Wh/kg) compared to batteries (10-100 Wh/kg). With the increased used in battery operated devices such as mobile phones, tablets and the like, there is an increased need for improved energy storage devices. Furthermore, in present CNTs based ECCs, the presence of high resistance leads to low power densities.

SUMMARY

Techniques and apparatus are disclosed for fabricating electrical storage devices.

In one exemplary aspect, an energy storage device is disclosed. The device includes a first electrode and a second electrode. The second electrode includes nanostructures comprising defects that increase charge storage capabilities of the energy storage device.

In another exemplary aspect, a method of fabricating an energy storage device is disclosed. A nanomaterial comprising nanostructures is produced. Using an electrophilic or nucleophilic additive, defects for increasing charge storage capability of the nanomaterial are generated in the nanomaterial.

In yet another exemplary aspect, a method of operating an energy storage device is disclosed. The energy storage device having a plurality of electrodes is operated to input an input electrical current and output an output electrical current. A defect-engineered nanomaterial is electrically coupled to the plurality of electrodes for storing electrical energy, wherein a level of defects is controlled by an additive so that the level of defects in the defect-engineered nanomaterial is a function of a desired input electrical impedance of the energy storage device.

In yet another aspect, an energy storage device includes a first electrode and a a second electrode comprising nanostructures and defects that are introduced into the nanostructures in addition to defects naturally occurred during manufacturing of the nanostructures, the introduced defects being electrically coupled to the second electrode and configured to have a level of defects controlled by an additive as a function of a desired input electrical impedance of the energy storage device.

These and other aspects are described in greater detail below, with reference to drawings.

BRIEF DESCRIPTION OF THE DRAWINGS

FIG. 8 is a graphical representation of charging current as a function of time for 5,000 cycles of Galvanostatic charging of a defect-engineered nanomaterial.

FIG. 12A is a pictorial illustration of energy as a function of density of states for semiconductor nanotubes.

Like reference symbols and designations in the various drawings indicate like elements.

DETAILED DESCRIPTION

In one aspect, various techniques for fabricating energy storage devices are disclosed in this document. In another aspect, various energy device storage structures are disclosed in this document. In yet another aspect, various nonmaterial compositions suitable for energy storage are disclosed. In one aspect, methods for generating defects in nanomaterials are disclosed. While defects may exists in nanomaterials due to manufacturing imperfections, the "defects" discussed below refer to defects that are engineered or generated in a controlled manner in a nanomaterial.

The below described carbon nanotube (CNT)-based supercapacitors can meet the increasing need of enhanced power and energy density. In one aspect, and without limitations, the described supercapacitors can have applications in energy, power, and charge storage devices, including: 1) a new type of energy and charge storage device with increased power density and increased energy density; 2) wireless sensors, remote powered devices; and 3) Integrated information processing devices.

The energy storage devices disclosed in this patent document are capable of scale-up to large volumes and some of the major issues in grid based energy storage, such as intermittency and variability of voltage and power supply. In one aspect the defects engineered into the CNTs contribute to an enhanced charge and energy density. In another aspect, the use of CNTs lowers the resistance for electrical transport and increases the power density. In some implementations, high energy density (up to ~100 Wh/kg) and high power density (up to ~$10^6$ W/kg), orders of magnitude better than those obtainable in commercial electrochemical capacitors, are achievable. The capacitances of the energy storage devices disclosed in this document could be tuned over three orders of magnitude which translate to tunable power/voltage storage/supply devices, and manipulated over the second to hour range. The devices disclosed in this patent document may be useful in frequency stabilization, voltage regulation, power smoothing, and energy shifting through integration with advanced energy storage and an industrial customer microgrid.

In the description presented in this document, several examples and results are provided using specific chemicals and compounds (e.g., cyanides). However, it is understood that various other suitable chemicals can be used. Furthermore, while may of the results have been presented with respect to aqueous solvents, organic solvents may also be used as substitutes. In one aspect, organic solvents provide superior performance over aqueous solvents due to the increased working voltage (2 to 3 volts) over 1 volt for aqueous solvents.

Figure 1A:
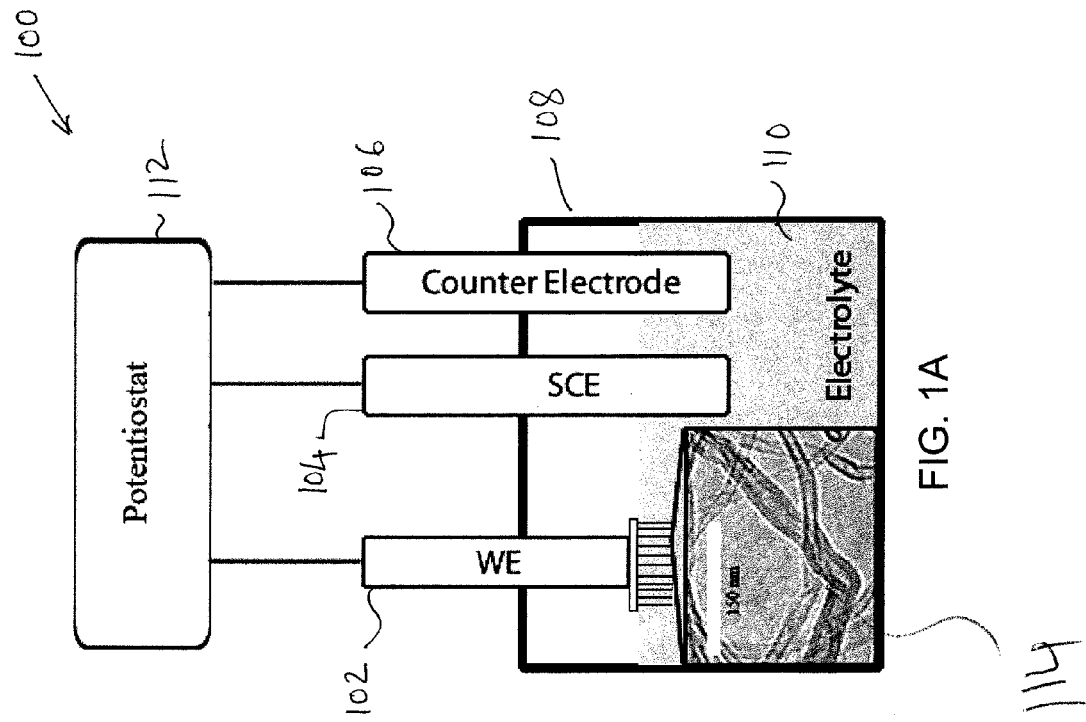
FIG. 1(a) shows a use of CNTs as the working electrode (WE) 102, with Platinum (Pt) as the counter electrode 106 in a Cyclic Voltammetry (CV) setup 100. A Standard Calomel Electrode (SCE) 104 may be used as the reference. Also shown in FIG. 1(a) is a TEM image of the individual nanotubes 114, with electrolyte 110 in a container 108.

FIG. 1(a) shows a use of CNTs as the working electrode (WE), with Pt as the counter electrode in a Cyclic Voltammetry (CV) setup. A Standard Calomel Electrode (SCE) was used as the reference. Also shown in FIG. 1(a) is a TEM image of the individual nanotubes.

Figure 1B:
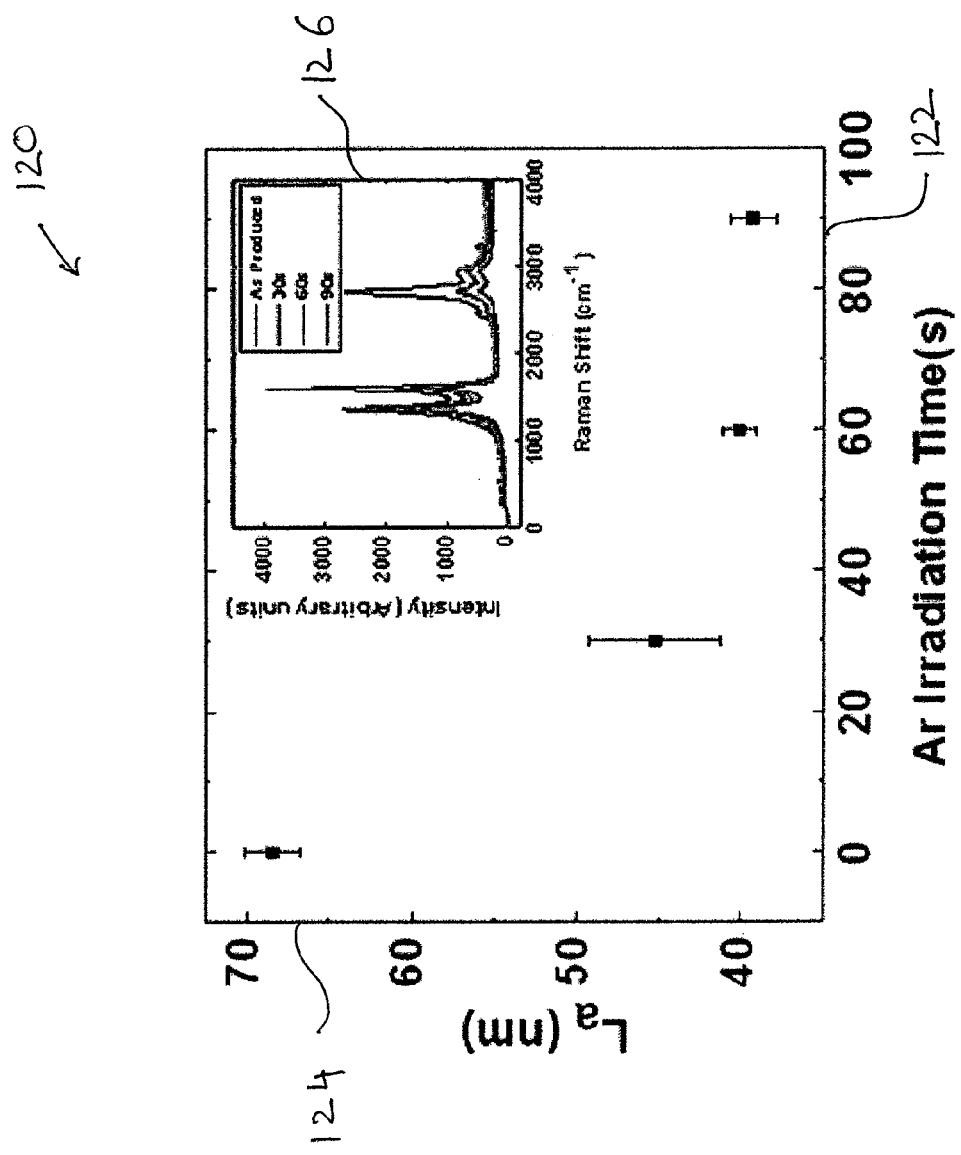
FIG. 1(b) is a graph 120 that shows the Raman spectra for the as-prepared and Ar irradiated (e.g., for times ~30 s-90 s) CNT electrodes, plotted with horizontal axis 122 representing Argon irradiation time and vertical axis 124 representing correlation length of nanomaterial in nanometers. The D- and G-peaks used for analysis are indicated. The inset 126 shows Raman spectra and the graph 120 that the correlation length ($L_a$) of the CNTs decreases with increasing Ar exposure.

FIG. 1(b) shows the Raman spectra for the as-prepared and Ar irradiated (e.g., for times ~30 s-90 s) CNT electrodes. The D- and G-peaks used for analysis (see text) are indicated. The inset shows that the correlation length ($L_a$) of the CNTs decreases with increasing Ar exposure.

FIG. 2 (a) shows the deconvolution of the observed CV spectrum (for Ar exposed CNT electrodes, under a cyanide concentration of 6 mM and a v of 20 mV/s) into the peak ($I_p$) and double-layer ($I_{dl}$) currents, using a baseline current ($I_c$).

Figure 2A:
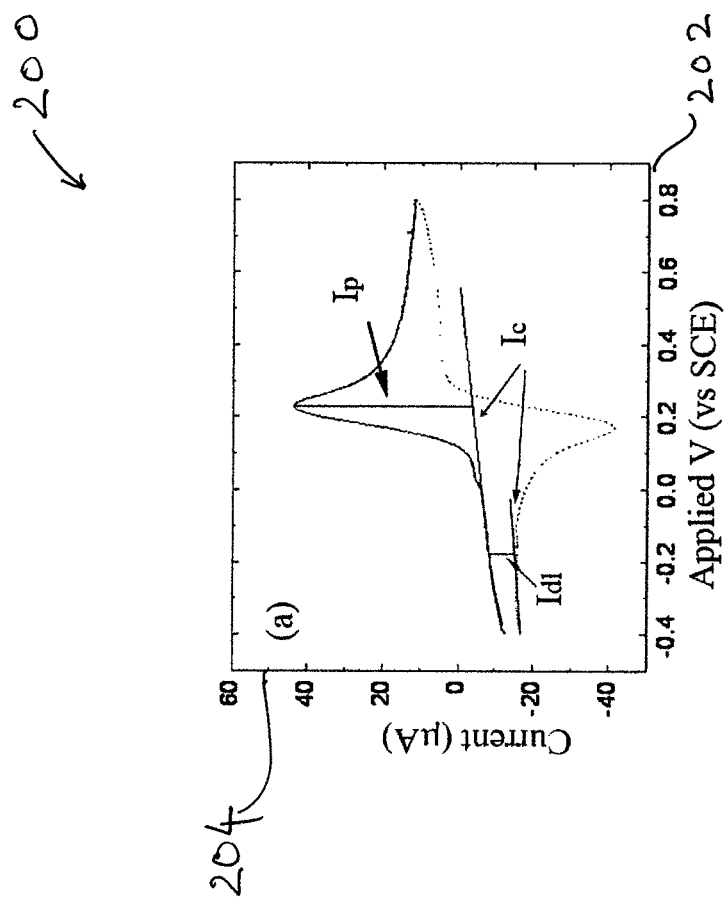
FIG. 2(a) shows the deconvolution of the observed CV spectrum.
Figure 2B:
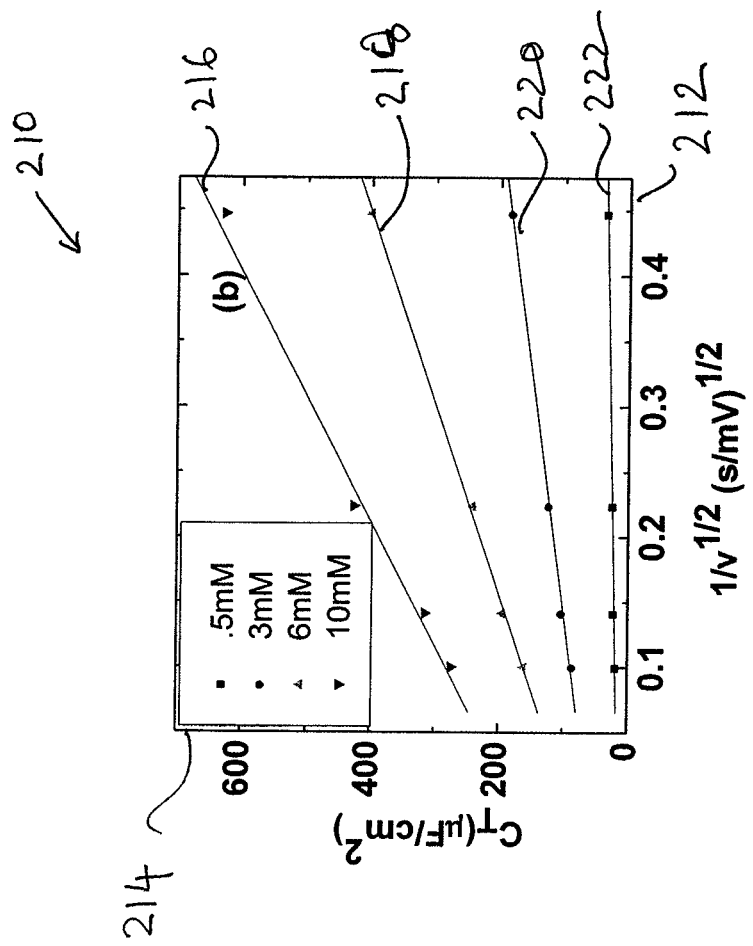
FIG. 2(b) shows the variation of the total CNT capacitance (CT) with $1/\sqrt{v}$, as a function of cyanide concentration.

FIG. 2(b) shows the variation of the total CNT capacitance ($C_T$) with $1/\sqrt{v}$, as a function of cyanide concentration.

Figure 2C:
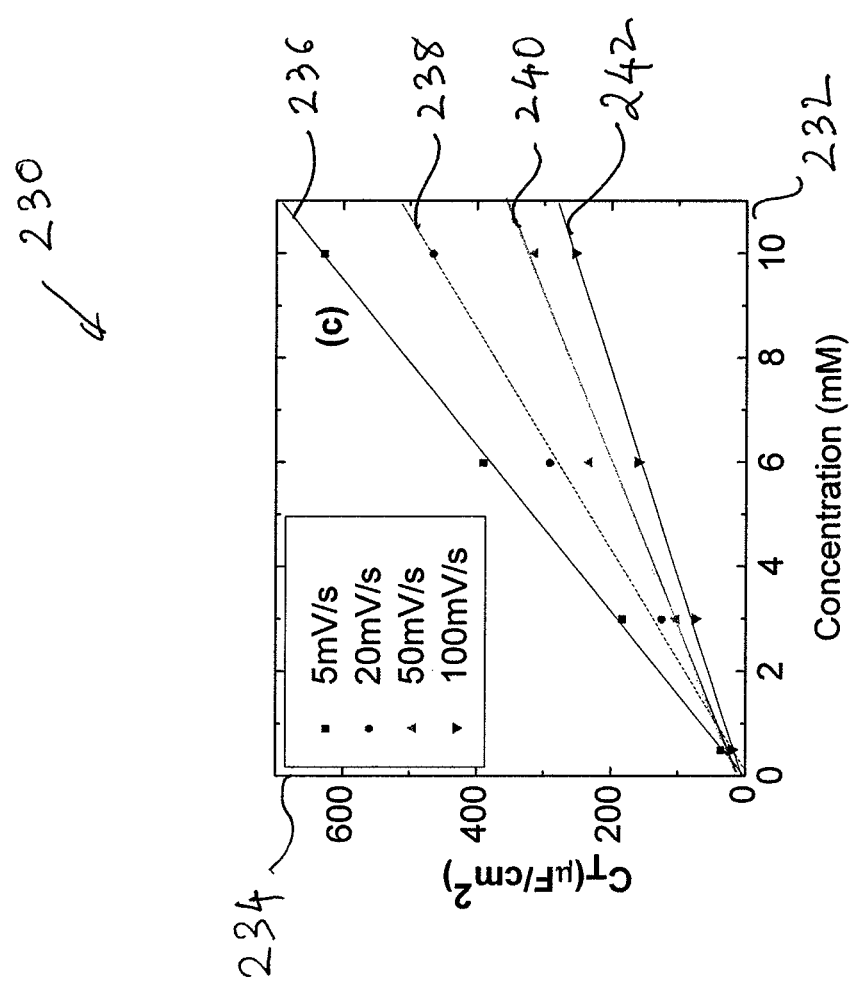
FIG. 2(c) shows the variation of CT with concentration, as a function of v.

FIG. 2(c) shows the variation of $C_T$ with concentration, as a function of v.

Figure 2D:
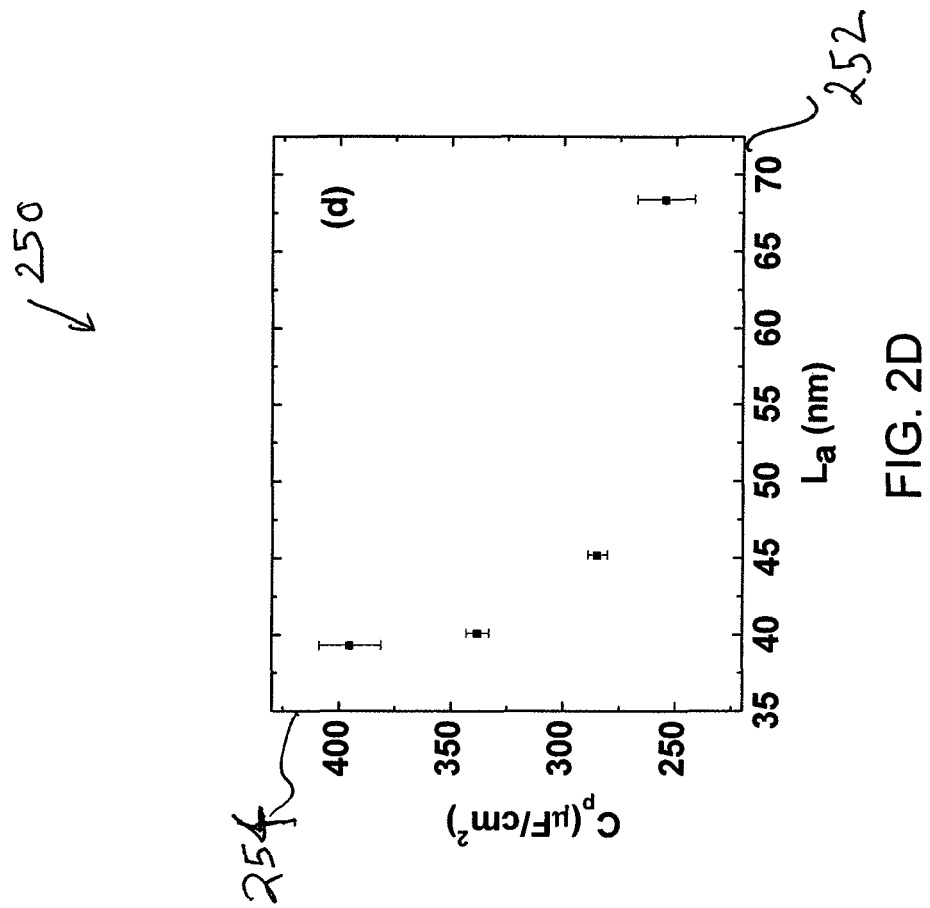
FIG. 2(d) shows the Cp correlates inversely to the La (a v of 5 mV/s and cyanide concentration of 6 mM was used for this plot).

FIG. 2(d) shows the $C_p$ correlates inversely to the $L_a$ (a v of 5 mV/s and cyanide concentration of 6 mM was used for this plot).

Like reference symbols and designations in the various drawings indicate like elements.

Techniques, apparatus and systems are described for using defects in CNTs for charge and energy storage. For example, the total CNT capacitance ($C_T$) and potential ways to improve $C_T$ are described. Also described are an accurate characterization and analysis of the electrostatic/double layer ($C_{dl}$) and faradaic/pseudo-capacitive ($C_p$) components of the $C_T$. It should be noted that $C_{dl}$ arises primarily due to charge separation across the electrode/electrolyte interface while $C_p$ requires adsorption of electroactive species coupled with charge transfer. $C_{dl}$ and $C_p$, can be potentially increased by implementing a method based on the controlled introduction of defects into the CNTs through Argon (Ar)

irradiation. Characterization of the CNT electrodes through Raman spectroscopy and Cyclic Voltammetry (CV) can illustrate the contributions to the $C_T$.

FIG. 1(a) shows a use of CNTs as the working electrode (WE), with Pt as the counter electrode in a Cyclic Voltammetry (CV) setup. A Standard Calomel Electrode (SCE) was used as the reference. Also shown in FIG. 1(a) is a TEM image of the individual nanotubes. Vertically aligned CNT mats were grown via thermal chemical vapor deposition (CVD) at 615° C. on Si substrates, using a 5 nm thick Fe catalyst. A feed gas mixture composed of acetylene (50 sccm for 1 min) and 500 sccm Argon was employed. Through scanning electron microscopy (SEM) and transmission electron microscopy (TEM), the synthesized CNTs were determined to be 100±5 μm long with a diameter of 17±3 nm, with 200±10 nm separation.

FIG. 1(b) shows the Raman spectra for the as-prepared and Ar irradiated (e.g., for times ~30 s-90 s) CNT electrodes. The D- and G-peaks used for analysis (see text) are indicated. The inset shows that the correlation length ($L_a$) of the CNTs decreases with increasing Ar exposure. To determine how defects create additional reactive sites and affect charge capacity, the as-grown CNT samples were then subject to Ar irradiation under various conditions in a Trion Reactive Ion Etching (RIE) chamber. We report results on CNT samples subject to an Ar flow rate of 10 sccm, under a background pressure of 30 mTorr, and applied power of 100 W, for 30-90 s of irradiation. Raman spectroscopy analysis, using a 514.5 nm, 1.49 mW Ar ion laser, was used to monitor the influence of the Ar exposure on CNT structural order and charging characteristics. The performance of the CNTs as electrodes was then characterized through Cyclic Voltammetry experiments using a PCI4-300 potentiostat (Gamry Instruments) where the CNTs were used as the working electrode, with Pt as the counter electrode and a standard calomel electrode (SCE) for reference as shown in FIG. 1(b). The electrochemistry of the CNTs was probed over a voltage range of −0.4 to 0.8 V using $K_3Fe(CN)_6$ (0.5-10.0 mM) in a KCl (1 M) supporting electrolyte over a scan rate range of 5-100 mV/s. This range was carefully chosen to eliminate the possibility of hexacyanoferrate complex adsorbate formation on the electrodes, which can possibly affect electron transfer kinetics.

Ar irradiation could be used to tune the number of defects in CNTs by monitoring the changes in the Raman peak intensities and peak widths (see, FIG. 1(b)). The ratio of the integrated D-peak intensity (at ~1350 cm$^{-1}$, originating from non-collinear stretches of carbon-carbon bonds) to the integrated G-peak intensity (at ~1580 cm$^{-1}$, from the linear stretching of the sp$^2$ bonds), $$\left(\frac{I_D}{I_G}\right),$$

was used to determine the defect correlation length ($L_a$), as defined through the Tuinstra-Koenig relation $$L_a(\text{nm}) = 4.4 / \left(\frac{I_D}{I_G}\right),$$

and characterize the defect density (see, FIG. 1(a)(b) and Table I).

TABLE I

Characterization of untreated and Ar irradiated CNTs through Raman spectroscopy

| Ar Irradiation time(s) | G peak wavenumber (cm$^{-1}$) | D peak wavenumber (cm$^{-1}$) | $(I_D/I_G)_L$ | $\Delta\omega_G$ (cm$^{-1}$) | $\Delta\omega_D$ (cm$^{-1}$) | $L_a$ (nm) |
|---|---|---|---|---|---|---|
| 0 | 1586.4 ± 2.1 | 1347.0 ± 0.7 | .64 ± .02 | 70.0 ± 1.3 | 116.4 ± 7.5 | 68.4 ± 1.7 |
| 30 | 1586.0 ± 1.2 | 1353.0 ± 1.0 | .98 ± .08 | 89.5 ± 3.6 | 101.9 ± 2.0 | 45.2 ± 4.0 |
| 60 | 1587.4 ± 1.4 | 1353.0 ± 1.0 | 1.10 ± .03 | 89.2 ± 7.4 | 95.6 ± 7.2 | 40.1 ± 1.0 |
| 90 | 1588.2 ± 0.5 | 1353.6 ± 1.2 | 1.12 ± .04 | 89.3 ± 2.1 | 99.5 ± 0.5 | 39.3 ± 1.4 |

It was seen that with increasing Ar exposure, $L_a$ decreases (see FIG. 1(b)), indicating an increase in the number of defects on the CNTs. The G-peak width also broadens due to Ar exposure, as indicated by the enhanced full width at half maximum ($\Delta\omega_G$) in Table I, and is up-shifted in frequency suggestive of CNT charging. The up-shift may be due to electron density being abstracted away from the carbon-carbon bonds effectively decreasing the bond-length[17] and increasing the vibration frequency. Additionally, a decreased $\Delta\omega_D$ could indicate a more uniform distribution of the defect energies.

Tuning the CNT charge and defect densities through Ar irradiation can influence both $C_{dl}$ and $C_p$. The electrochemical characteristics of as-prepared and defect tuned CNTs were proved through CV by deconvoluting the total capacitive current $I_T$ ($=C_T\nu$), where $\nu$ is the scan rate, into contributions from the double-layer and pseudo-capacitive currents ($I_T=I_{dl}+I_p$), using standard procedures. FIG. 2 (a) shows the deconvolution of the observed CV spectrum (for Ar exposed CNT electrodes, under a cyanide concentration of 6 mM and a $\nu$ of 20 mV/s) into the peak ($I_p$) and double-layer ($I_{dl}$) currents, using a baseline current ($I_c$). FIG. 2(b) shows the variation of the total CNT capacitance ($C_T$) with $1/\sqrt{\nu}$, as a function of cyanide concentration. FIG. 2(c) shows the variation of $C_T$ with concentration, as a function of $\nu$. FIG. 2(d) shows the $C_p$ correlates inversely to the $L_a$ (a $\nu$ of 5 mV/s and cyanide concentration of 6 mM was used for this plot). To summarize, the values of $I_{dl}$ and $I_p$ were carefully determined by first linearly fitting the current baseline ($I_c$) and then calculating $I_p$ ($=I$ ($E_p$)$-I_c$) and $I_{dl}$ ($=I_{C, cathodic}-I_{C, anodic}$) (see FIG. 2a), where $E_p$ is the potential/voltage at which the current due to the faradaic reaction is maximum.

From the determination of $I_{dl}$ ($=C_{dl}\nu$) and a known $\nu$, we estimate $C_{dl}$. To understand $C_{dl}$, we assume that $$C_{dl}\left(=\frac{\varepsilon_o\varepsilon_r A}{L_D}\right)$$

can be modeled as a parallel plate capacitor, in which $L_D$ can be used as a measure of the diffuse ion layer thickness around the electrode of area A, in an electrolyte with a dielectric constant $\epsilon_r$. We estimate $\epsilon_r$ to be ~80, $\epsilon_o$=8.854× $10^{-12}$ $C^2/Nm^2$, and the A of the CNT electrode to be ~100 $m^2$/g by considering the surface area of each nanotube[21], which is equivalent to treating each CNT as an individual electrode. Assuming a coupling between the individual CNTs and taking the projected area of the electrode (~$mm^2$) leads to unrealistically high values for the capacitances of the order of $mF/cm^2$ and $L_D$ of the order of 0.005 nm.

The current due to the pseudo-capacitance, $I_p$ (=$C_p v$), which arises from the faradaic reactions at the CNT surface, was then derived from the cathodic/anodic peak current values. At 298 K, $I_p$ is defined through the Randles-Sevcik equation, i.e., $I_p$=2.65·$10^5$ $n^{1.5}$ $c_i\sqrt{D_o v}$=$Bc_i\sqrt{v}$, where $D_o$ (~6.9×$10^{-6}$ $cm^2$/s) is the diffusion coefficient of the cyanide species[23], n is the number of electrons transferred per a given redox reaction, and B (/B') is a constant. From $I_T$=$I_{dl}$+$I_p$, we deduce that $C_T$ varies with the $v$ as:

$$C_T = \frac{B'}{\sqrt{v}} + C_{dl},$$

where $C_p$ varies as $$\frac{1}{\sqrt{v}}$$

and $C_{dl}$ is constant. Plots of $C_T$ vs. $1/\sqrt{v}$ (see FIG. 2b) were then used to extract the individual values of $C_p$ and $C_{dl}$ for both untreated and Ar exposed CNTs, which have then been tabulated as a function of scan rate (Table II for $C_p$) and concentration (Tables III and IV for $C_p$ and $C_{dl}$, respectively).

Table II shows the variation of $C_p$ with Ar irradiation time, for untreated and Ar exposed CNTs, as a function of scan rate ($v$). The $K_3Fe(CN)_6$ concentration was fixed at 6 mM.

TABLE II

| Scan Rate (mV/s) | Ar Irradiation Time(s) | | | |
|---|---|---|---|---|
| | 0 $C_p(\mu F/cm^2)$ | 30 $C_p(\mu F/cm^2)$ | 60 $C_p(\mu F/cm^2)$ | 90 $C_p(\mu F/cm^2)$ |
| 5 | 254.5 ± 12.8 | 284.7 ± 4.3 | 338.1 ± 5.0 | 395.0 ± 14.0 |
| 20 | 155.2 ± 7.9 | 170.1 ± 8.6 | 166.3 ± 1.4 | 247.2 ± 9.2 |
| 50 | 109.9 ± 5.6 | 123.9 ± 3.7 | 110.9 ± 3.4 | 187.7 ± 7.8 |
| 100 | 82.2 ± 4.1 | 101.0 ± 3.6 | 94.2 ± 7.8 | 116.0 ± 4.0 |

Table III shows the variation of $C_p$ with Ar irradiation time, for untreated and Ar exposed CNTs, as a function of $K_3Fe(CN)_6$ concentration. The scan rate was fixed at 20 mV/s.

TABLE III

| Concentration (mM) | Ar Irradiation Time(s) | | | |
|---|---|---|---|---|
| | 0 $C_p(\mu F/cm^2)$ | 30 $C_p(\mu F/cm^2)$ | 60 $C_p(\mu F/cm^2)$ | 90 $C_p(\mu F/cm^2)$ |
| 0.5 | 10.7 ± 0.3 | 10.3 ± 0.8 | 13.1 ± 0.8 | 14.6 ± 0.6 |
| 3 | 83.4 ± 6.0 | 82.6 ± 1.0 | 84.0 ± 3.9 | 107.7 ± 3.5 |
| 6 | 155.2 ± 7.9 | 170.1 ± 8.6 | 166.4 ± 1.4 | 247.2 ± 9.2 |
| 10 | 316.2 ± 20.7 | 261.2 ± 3.4 | 308.8 ± 1.6 | 413.0 ± 34.0 |

Table IV shows the variation of $C_{dl}$ with Ar irradiation time, for untreated and Ar exposed CNTs, as a function of $K_3Fe(CN)_6$ concentration. The scan rate ($v$) was fixed at 20 mV/s.

TABLE IV

| Concentration (mM) | Ar Irradiation Time(s) | | | |
|---|---|---|---|---|
| | 0 $C_{dl}(\mu F/cm^2)[L_D(nm)]$ | 30 $C_{dl}(\mu F/cm^2)[L_D(nm)]$ | 60 $C_{dl}(\mu F/cm^2)[L_D(nm)]$ | 90 $C_{dl}(\mu F/cm^2)[L_D(nm)]$ |
| 0.5 | 3.39 ± 0.49 [~20.5] | 9.13 ± 0.19 [~7.6] | 8.06 ± 0.95 [~8.6] | 10.05 ± 1.03 [~6.9] |
| 3 | 7.23 ± 0.42 [~9.3] | 10.43 ± 0.20 [~6.7] | 12.50 ± 2.36 [~5.6] | 16.09 ± 0.49 [~4.3] |
| 6 | 16.14 ± 0.65 [~4.3] | 16.20 ± 2.57 [~4.3] | 19.73 ± 2.34 [~3.5] | 43.93 ± 0.56 [~1.6] |
| 10 | 23.08 ± 1.53 [~3.0] | 23.23 ± 0.99 [~3.0] | 41.17 ± 1.18 [~1.7] | 57.49 ± 2.95 [~1.2] |

The error bars for all the determined values have been estimated through the standard deviation of data over multiple measurements. As expected, larger values of $C_p$ are manifested at smaller scan rates (see Table II). It was interesting then to note a monotonic increase in $C_p$ with increased Ar exposure, with an ~50% rise at a given $v$, e.g., ~255 $\mu F/cm^2$ enhanced to ~395 $\mu F/cm^2$ at 5 mV/s, and ~82 $\mu F/cm^2$ enhanced to ~116 $\mu F/cm^2$ at 100 mV/s.

The influence of Ar irradiation in increasing both $C_p$ and $C_{dl}$ was also seen as a function of the $K_3Fe(CN)_6$ concentration. For a particular CNT treatment (i.e., as synthesized or Ar exposed) $C_p$ increases with concentration (see Table III), in accordance with the Randles-Sevcik equation. A further enhancement of $C_p$ by 30-60%, at any given concentration, was seen due to the introduction of Ar, presumably due to the creation of additional electroactive defects and reactive sites. The $C_p$ increase was correlated to the decreased $L_a$ (FIG. 3d), which again indicates the importance of defects for increased charge storage. However, the influence of Ar irradiation seems to be even more strongly felt through a 120-200% increase in $C_{dl}$ (Table IV), e.g., ~3 $\mu F/cm^2$ enhanced to ~10 $\mu F/cm^2$ at 0.5 mM, and ~23 $\mu F/cm^2$ enhanced to ~57 $\mu F/cm^2$ at 10 mM. The change of the ambient conditions around the electrode, as a function of CNT exposure to Ar, can also be indicated through a reduced $L_D$ which was estimated from $C_{dl}$ (Table IV). For example, it was noted that the changes in $C_{dl}$ with concentration was due to the changes in the Debye length ($\kappa$), where we found that the $$\kappa \left(\sim \frac{1}{\sqrt{c_i}}\right)^{11,24}$$

was approximately equal to $L_D$. Essentially, an increased number of reaction sites allows for a greater ion concentration around the electrode and concomitantly higher residual charge. The values of $C_{dl}$, were then slightly larger than previously observed due to a decreased $L_D$.

It will be appreciated that a method of using defects in carbon nanotubes for energy storage, the method comprising creating charged defects on carbon nanotubes to increase charge storage capabilities of the carbon nanotubes, wherein the charged defects on nanotubes create additional charge sites enhancing the stored charge, is disclosed. In some designs, creating the charged defects comprises changing an amount and a type of charge associated with the charged defects by bombarding the carbon nanotubes with argon or hydrogen. This may further include controlling the bombarding process to regulate a number of the charged defects.

It will also be appreciated that a method of determining a total carbon nanotube capacitance is disclosed. The method includes determining an electrostatic/double-layer and faradaic/pseudo-capacitive components of a total capacitance in carbon nanotubes. In some designs, the method further includes increasing at least one of the two components to control introduction of defects into the carbon nanotubes. In some designs, the method further includes comprising increasing at least one of the two components to control introduction of defects into the carbon nanotubes through argon irradiation.

It will also be appreciated that an energy storage device comprising a reference electrode a counter electrode and a working electrode comprising carbon nantotubes, wherein the carbon nanotubes comprises charged defects on carbon nanotubes to increase charge storage capabilities of the carbon nanotubes is disclosed.

Figure 3:
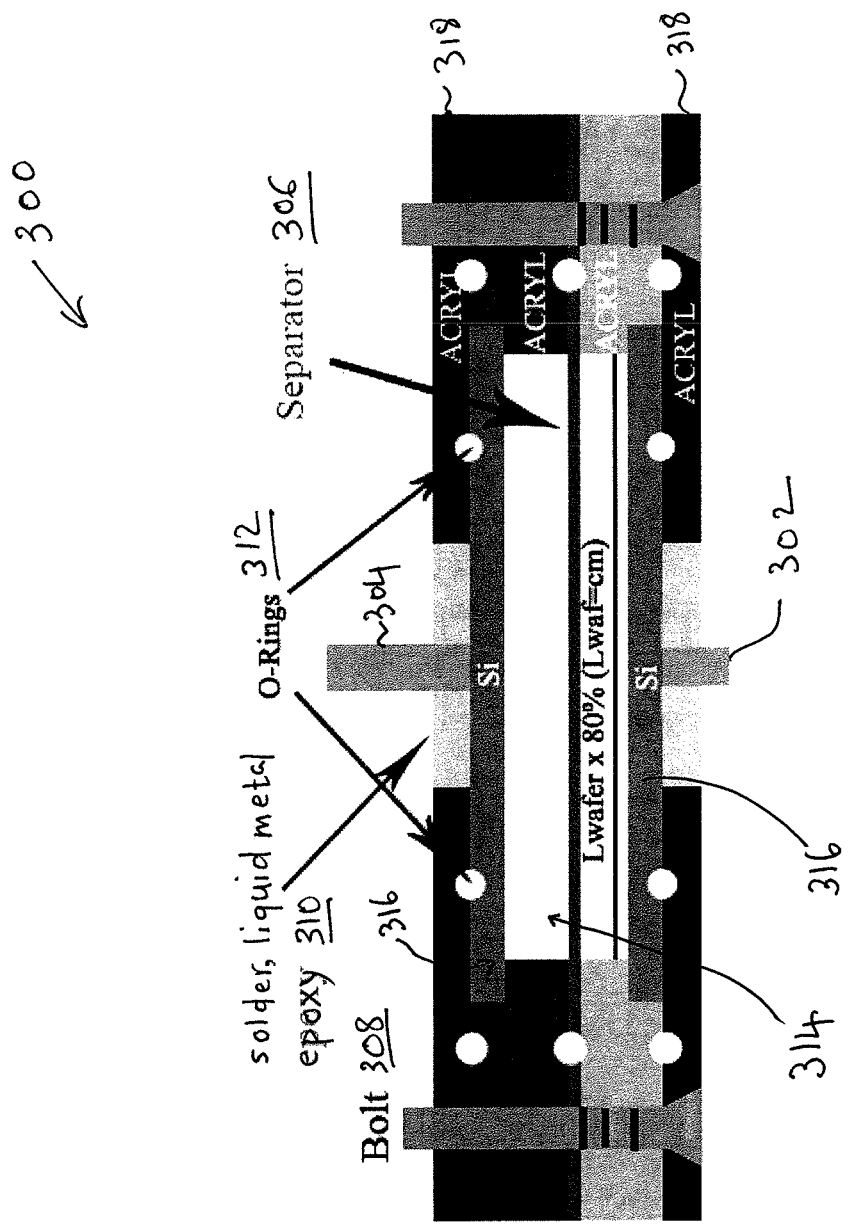
FIG. 3 depicts a cross section of an exemplary energy storage device.

With reference to FIG. 3, a cross-sectional view of an embodiment of an energy storage device 300 is depicted. The storage device 300 is generally shown to be rectangular only for clarity of drawings. In general, the shapes and sizes of the various components of the storage device 300 may be adapted to suit a particular dimension requirement for an application. For example, the storage device 300 may be made to have the shape of a disc, a cylinder or a flattened rectangular brick, depending on the intended use (e.g., a low profile embodiment may be suitable for handled devices or wireless sensors, etc.)

Electrodes 302 and 304 may be packaged together in the device 300 assembly that is bolted together using bolts 308. The energy storage device 300 also includes a separator 306 that separate the electrodes 302 and 304. The electrodes may be sealed on to the device 300 using O-rings 312 and epoxy material 310. The electrodes may further be coupled to spacers 314 and 316 separated from each other by spacing 314. The spacing 314 may be filled with a solvent (not shown in FIG. 3) that may include defect-engineered nanomaterials. The base plates 318 supporting the bolts may be made of acrylic or Teflon material. The O-rings 312 may be made of hardened silicon or another suitable semiconductor. Tin or lead solder may be used for connecting various structural elements depicted in FIG. 3. In some implementations, the separator 306 is made from porous element that allows movement of solvent. The porosity of the separator 306 may depend on the solute used, the solvent used and the redox couple.

Figure 4:
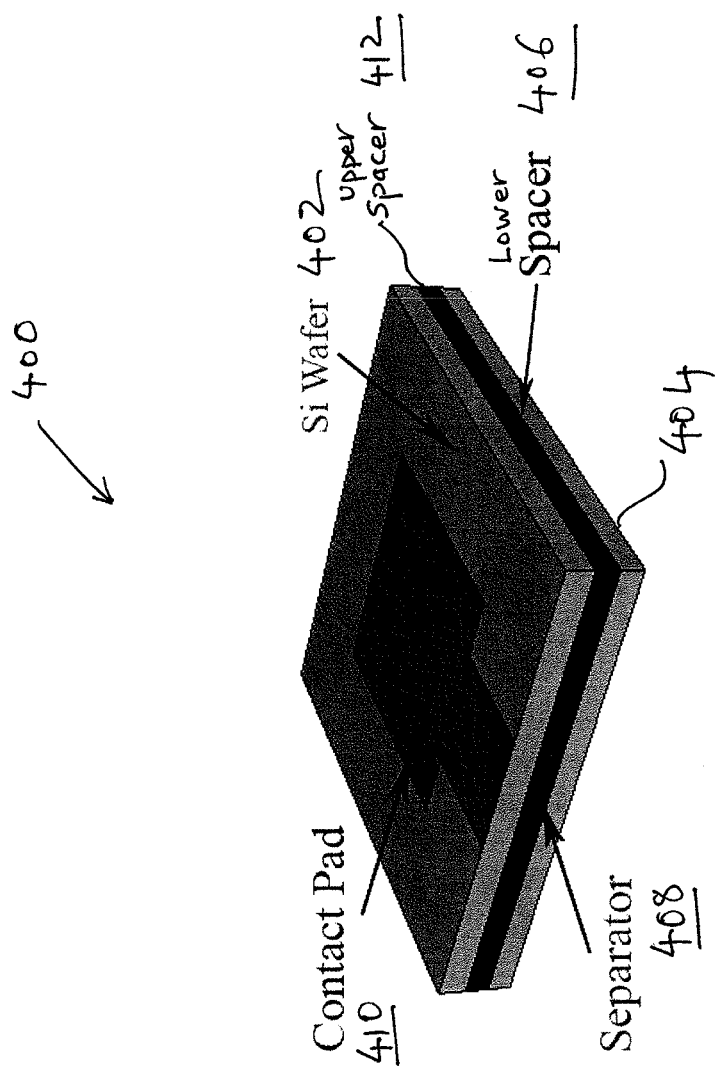
FIG. 4 depicts another exemplary energy storage device.

FIG. 4 depicts another embodiment of an energy storage device 400. The storage device 400 is shown to have a rectangular profile only for clarity of drawing. As previously discussed with respect to the energy storage device 300, practical implementations of the storage device 400 may or may not be rectangular in shape.

The device 400 may include a first electrode (e.g., semiconductor or silicon wafer 402) and a second electrode 404 (e.g., a semiconductor or silicon wafer). In some implementations, the wafers 402, 404 are substantially planar sheets. In some implementations, the wafers 402, 404 are positioned in planes parallel to each other and separated by a space. A first spacer 412 (called the upper spacer but "upper" and "lower" directions are arbitrary and only for convenience of description) may be positioned in close proximity of the wafer 402 and may match the wafer 402 in size and shape. A second spacer 406 (called lower spacer 406) may be positioned in close proximity of the wafer 404 and may match the wafer 404 in size and shape. The spacers 406 and 412 may lie in planes parallel to each other and may be separated from each other by a separator 408. A contact pad 410 may be attached to a surface of the wafer 402 away from the surface close to the spacer 412. A second contact pad may similarly be positioned to couple with the spacer 404 (not visible in FIG. 4).

In some implementations, the energy storage device 400 may be immersed in a solven comprising defect-engineered nanomaterials. In some implementation, the entire assembly of the storage device 400 and solvent may be vacuum or shrink wrapped for use. In some implementations the spacer may comprise a non-reactive, non-corrosive and non-conducting material. In some implementations, the contact pad may comprise a conductive alloy such as Ti/Ag or Ti/Au or combinations of metals with high melting points (e.g., greater than 900° C. to withstand heat generated during operation). In some implementations, the separator may comprise a porous membrane that allows solvent movement. The porosity value of the separator membrane may depend on the solute, solvent and redox couples used in the implementation.

Figures 5A, 5B:
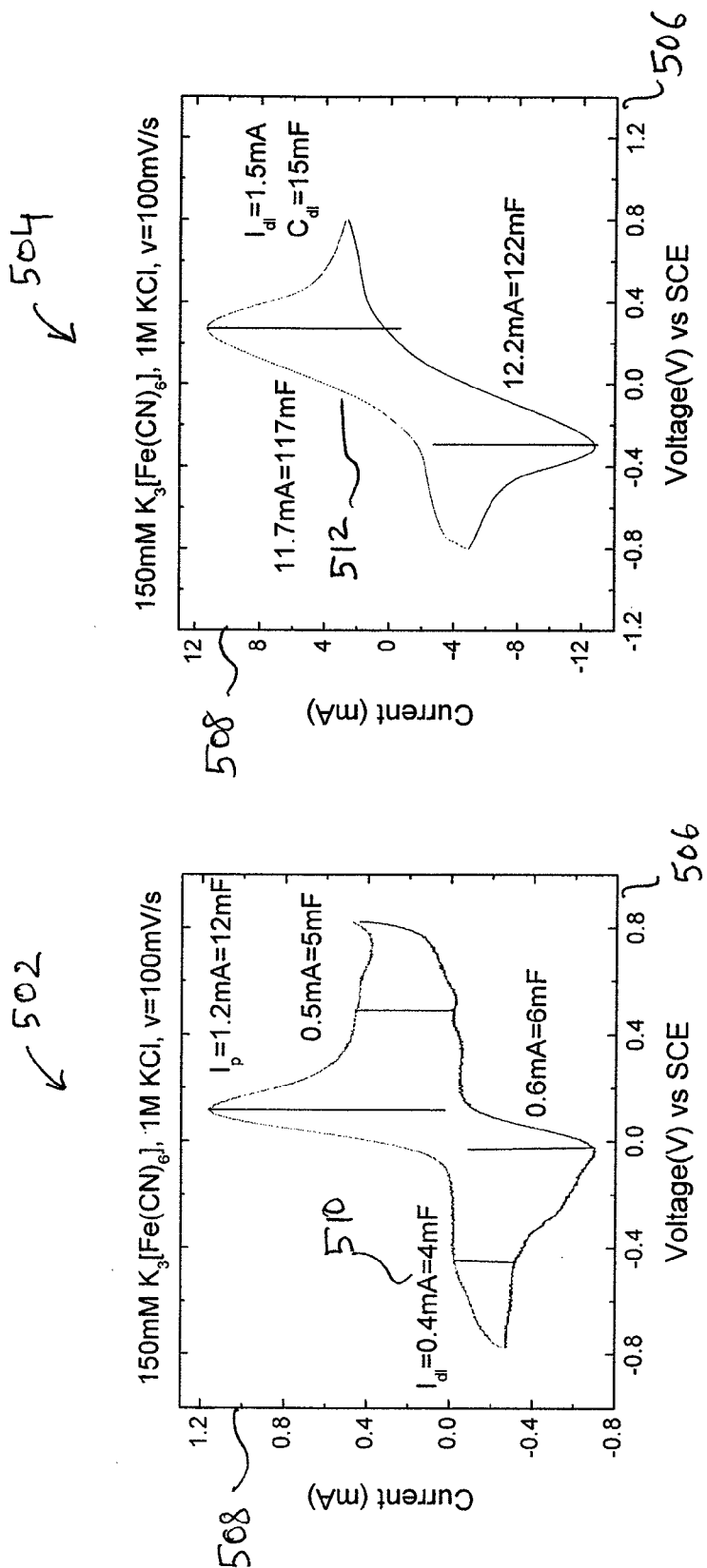
FIG. 5A illustrates current v. voltage characteristic of an "as produced" nanomaterial.
FIG. 5B illustrates current v. voltage characteristic of an argon radiated nanomaterial.

FIG. 5A is a graphical representation 502 of current-voltage characteristic of a storage device using an "as produced" nanomaterial on voltage v. SCE as the horizontal axis 506 and the current in mA as the vertical axis 508. As shown by curve 510, the nanomaterial exhibits peak current $I_p$ value of about 1.2 mA.

FIG. 5B is a graphical representation 504 of current-voltage characteristic of a storage device using a nanomaterial in which defects have been generated using Argon irradiation, on voltage v. SCE as the horizontal axis 506 and the current in mA as the vertical axis 508. As shown by curve 512, the nanomaterial exhibits $I_p$ value of about 11.7 mA. It will be appreciated that there is about a ten-fold increase in the peak current, which may translate to a ten-fold increase in potential and correspondingly a ten-fold increase in capacitance (or energy storage capacity) at an operating value of 100 mV/s.

Figure 6:
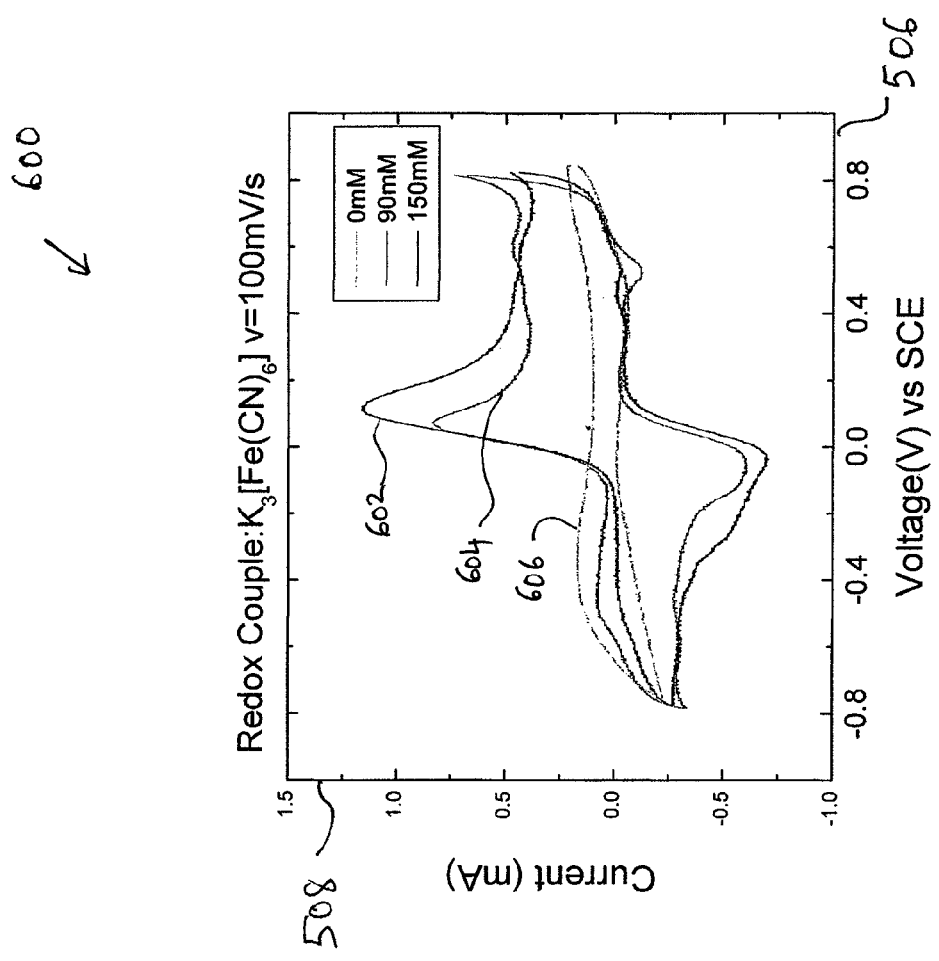
FIG. 6 illustrates changes to the current v. voltage characteristic of a nanomaterial as a function of Redox couple concentration.

FIG. 6 is a graphical representation 600 depicting changes to the peak current $I_p$ as a function of the redox couple concentration used. Curves 602, 604 and 606 represent current-voltage characteristics for redox couple concentrations of 150 mM, 90 mM and 0 mM respectively. As can be seen, in one aspect, the redox couple concentration may be used to achieve or modify a desired value of a peak current $I_p$. In other words, in some implementations, redox couple concentration can be used to achieve a desired peak capacitance or energy storage capacity of the energy storage device.

Figure 7:
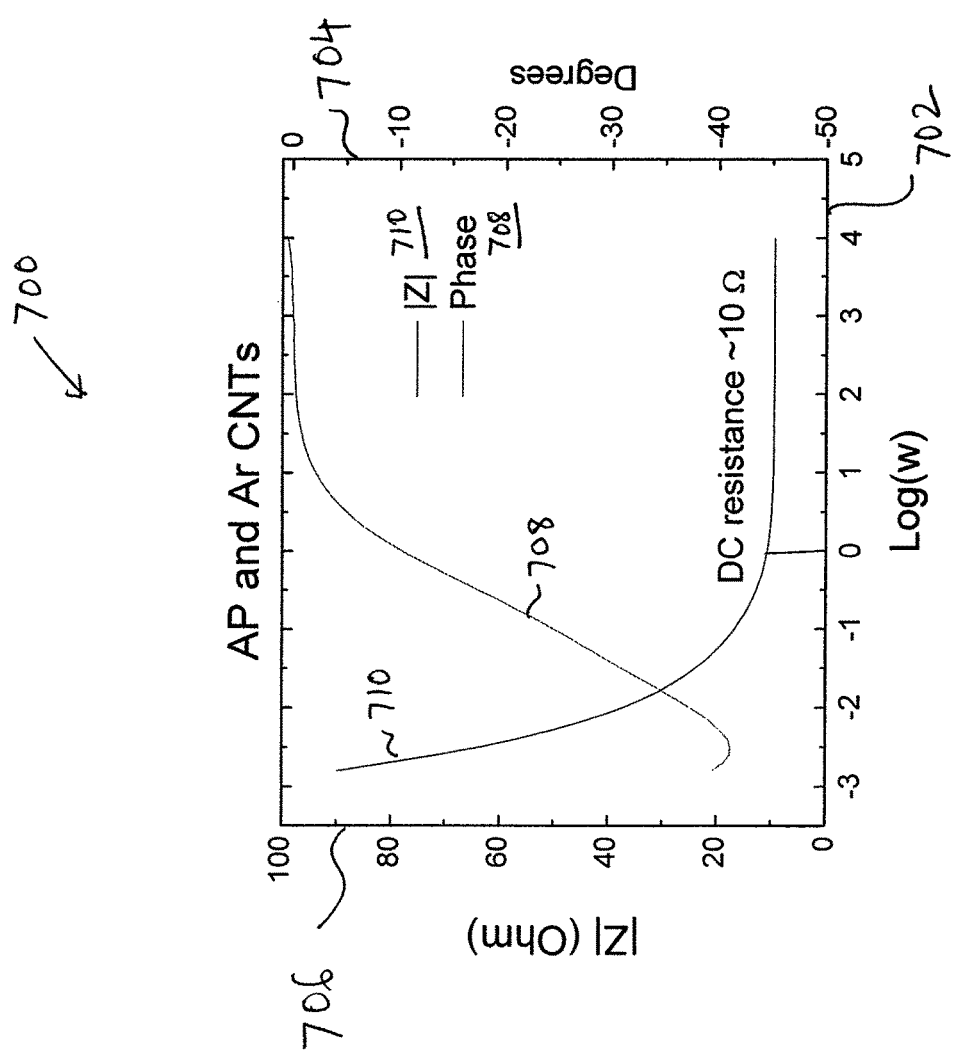
FIG. 7 is a graphical representation of results obtained by performing electrochemical impedance spectroscopy on a defect-engineered nanomaterial.

FIG. 7 illustrates the results obtained by performing electrochemical impedance spectroscopy (EIS) on "as produced" nanomaterial and defect-engineered nanomaterial (using Argon irradiation.) Graph 700 shows the impedance in Ohms 710 (vertical axis 706) and phase in degrees 708 (vertical axis 704) on a logarithmic scale (horizontal axis 702).

FIGS. 8A and 8B show graphs 800 and 802, illustrating effects by repeating galvanostatic charging of energy storage devices "as produced" 800 and defect-engineered (using Argon irradiation) 802 about 5,000 times. The vertical axes 806 and 808 represent voltage as a function of the horizontal axis 804 representing time (or number of charge cycles). As can be seen, defect-engineered nanomaterial shows a charge behavior that is comparable or better than "as produced" nanomaterial behavior.

Briefly revisiting the results shown in FIGS. 5A, 5B, 6, 7, 8A and 8B, cyclic voltametry (CV) charging and galvanostatic charging of defect—engineered nanomaterials exhibit a ten-fold increase in capacitance over "as produced" nanomaterials. In some implementations, total capacitance at 100 mV/s operating voltage, may be 1.2 mF (52 F/g) for "as produced" nanomaterial and may be 15 mF (511 F/g) for defect-engineered nanomaterial. Furthermore, approximately the same DC resistance (10 Ohm) is exhibited by both "as produced" and "defect engineered" nanomaterials (curve 710). Furthermore, over 5,000 to 10,000 cycles of galvanostatic charging, "as produced" and "defect engineered" nanomaterials exhibit similar performance (less than 5% reduction in capacitance). While not shown in the graphs, similar characteristics are exhibited by "as produced" and "defect engineered" nanomaterials over at least 375,000 charge cycles.

Figures 9A, 9B:
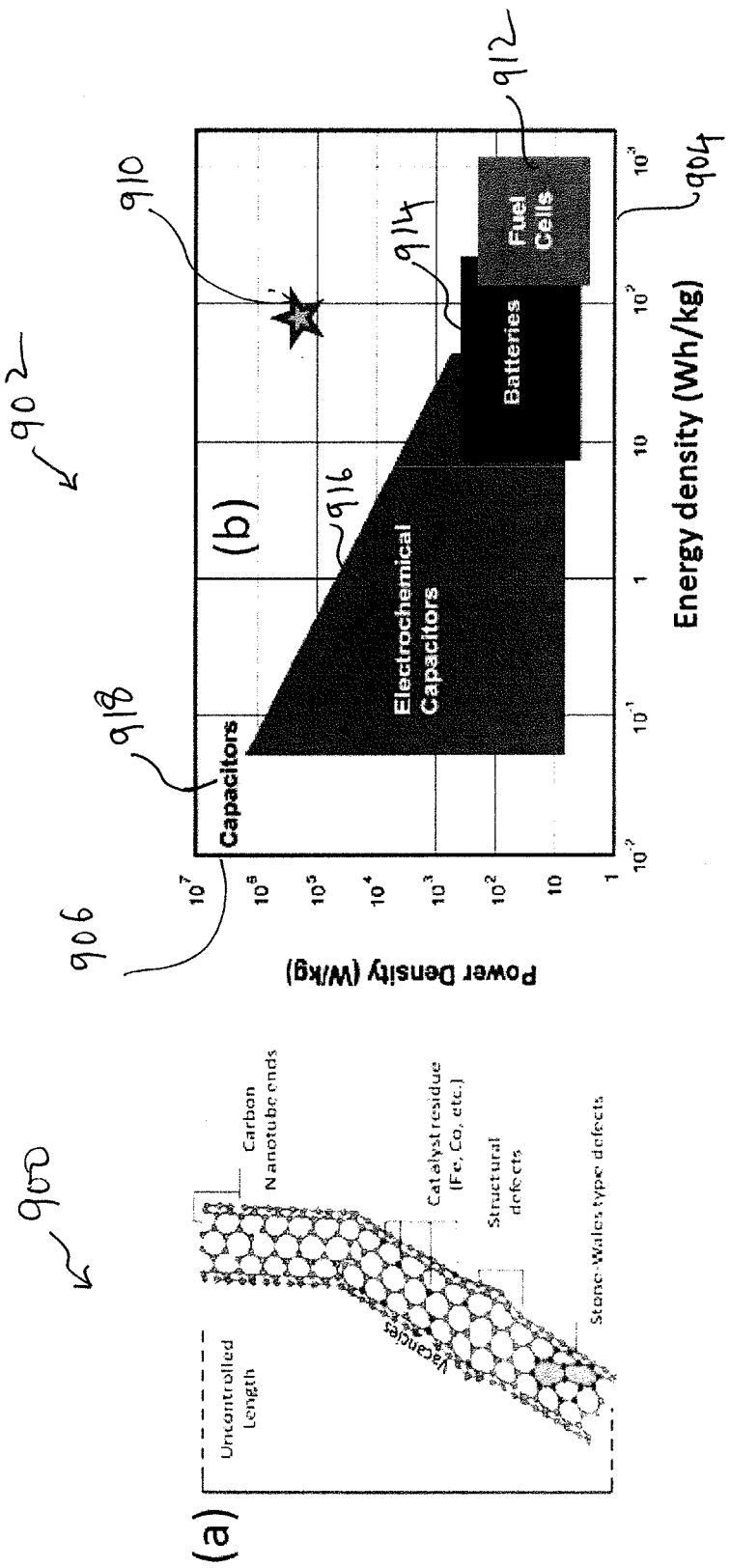
FIG. 9A illustrates an example of a defect-engineered single-walled carbon nanotube.
FIG. 9B illustrates a plot of power density as a function of energy density for various energy storage devices.

With reference to FIG. 9A, carbon nanotubes (CNTs) have been extensively studied due to their, postulated, remarkable mechanical, thermal, electrical and chemical properties. One of the major issues preventing the widespread realization of their theoretically predicted properties is a good understanding and lack of control over the microscopic aspects. As depicted in FIG. 9A, for example, CNTs may include inevitable defects that could adversely affect their performance. For example, it has been shown that Stone-Wales defects (pentagon-heptagon pairs) reduce CNT strength three-fold while divacancy defects could significantly diminish electrical conductivity.

On the other hand, such defects are thought to be integral to applications of CNTs involving field emission and electrochemistry, e.g., as electrodes with fast electron transfer kinetics, electrochemical/super-capacitors, biochemical sensors, etc. In this context, it has been pointed out that the electrocatalytic behavior along the length of the CNT would be similar to the basal planes of graphite while the ends correspond to the edge planes and could be influenced by dangling bonds, as in edge-plane graphite. The latter corresponds to a large defect density which could be profitably used for enhanced sensitivity. Consequently, CNT characteristics influenced by the presence of defects, which are entropically inevitable, are studied for insights into the interplay of structure, properties, and eventual application. As described in this document, defects that increase energy storage capacity can be engineered into nanomaterials for increasing charge and energy storage capacity.

FIG. 9B depicts a plot 902 of power density (vertical axis 906) as a function of energy density (horizontal axis 904) for various energy storage devices. Typical performance of capacitors, electrochemical capacitors, batteries (e.g., alkaline batteries) and fuel cells are depicted in regions 918, 916, 914 and 912 respectively. For example, present batteries (region 914) provide performance that is relatively high in energy density, but low in power density (i.e., batteries may take longer for charging). Compared to these present art energy storage devices, the performance of defect-engineered nanomaterial based energy storage devices may be in the region 910—i.e., such energy storage devices may have a relatively high energy density and a relatively high power density—allowing quick charging of such devices. As depicted, typical implementations may yield 100 Wh/kg energy density and 100 kW/kg power density.

In some implementations, a degree of control can be exerted over the defect density through exposure to various kinds of ions, e.g., it was seen that Argon ion irradiation had the influence of imparting a net positive charge to the CNTs while hydrogen had the effect of neutralizing the defects. A practical use of such effects may be manifested through beneficial electrochemical characteristics of the modified CNTs, where an eight-fold enhancement in the charge density over the nominally expected values may be possible. The novel charge storage mechanism lends itself to possible deployment in electrochemical capacitors/supercapacitors incorporating both high energy and power density. As described in this document, a semi-quantitative measure of defect type, density, charge etc. is possible through detailed Raman spectroscopy and electrochemical techniques.

In one aspect, nanomaterials such as CNTs may be engineered to include electrically charged defects in CNTs, where a high density of charge due to their large surface area/volume ratio concomitant with low electrical resistance, facilitated through suitable materials processing techniques, can enable large charge/energy densities and power densities, respectively. Such defect tuned CNTs could be used as components of electrochemical capacitors/supercapacitors. The fruition of such devices, as possible competitors to conventional batteries through their ability of fast charge and discharge (seconds compared to the minutes required in batteries), large cycle life (~1 million cycles), would be relevant wherever energy storage and utilization is a concern.

In some implementations, hydrogen and other gas/ion irradiation for tuning the charge state of the CNT vis-à-vis structural order may be utilized to produce the defects. In some designs, electron/n-doping may be performed on CNTs for obtaining a large voltage range, which may be useful in electrochemical capacitors.

In various designs, defects may be introduced into nanomaterials to (a) obtain a degree of control over the defect density in the CNT, (b) tune the charge, or the (c) extent of structural order in the CNT, and then consider (d) applications, such as electrochemical sensors, which benefit from defects. Our experiments indicate that different states of order and charge seem to be obtained in CNTs through exposure to hydrogen and argon irradiation, e.g., argon inducing positive charges and hydrogen rendering CNTs neutral. Such correlations may further be through the use of a wider range of energies and other process parameters, e.g., pressure and flow rate. Our experiments show that irradiation energy in the range 0.1-10 eV/atom may be sufficient to induce intercalation of elements for charge induced modulation of electrical/electrochemical characteristics, with minimal atomic displacements/rearrangements—FIGS. 10A and 10B.

The presently described techniques for engineering defects into nanomaterials could also use processes such as reactive ion etching (RIE), e.g., using 0 to 200 W power, and inductive coupling plasma (ICP), using 0 to 150 W power. These techniques may be used to produce control the engineering of isotropic or non-isotropic defects. The power used in the RIE and ICP processes may be used to control the density of defects engineered (higher power typically yields higher defect density), which in turn may control the input impedance of the corresponding energy storage device. Furthermore, the time of reaction may also be used to control the density of engineered defects.

Figures 10A, 10B:
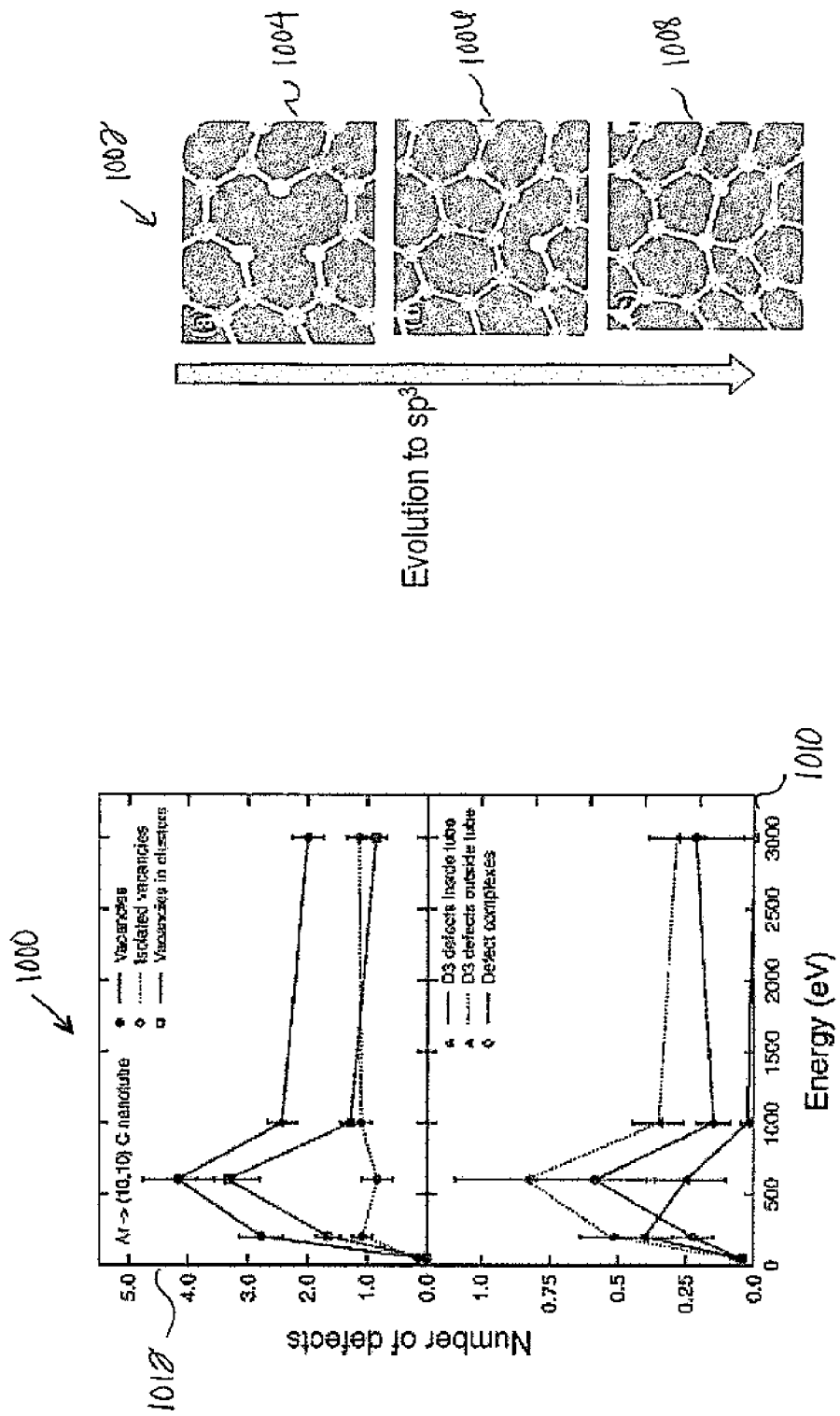
FIG. 10A illustrates an example of number of defects engineered into a nanomaterial as a function of voltage applied using Argon ion radiation.
FIG. 10B illustrates example changes in the structure of carbon nanotubes due to increased Ar ion irradiation.

FIG. 10A depicts a chart 1000 where number of defects (axis 1012) are plotted as a function of energy in eV (axis 1010) that shows that a controlled number of defects, and charge, can be introduced for tuning I-V characteristics of CNT based electronic devices through Ar ion irradiation.

As depicted in FIG. 10B, by increasing irradiation, for example in panels a, b & c (1004, 1006 and 1008) can be used to vary the $sp^2$ bonding character to a more $sp3$ variety in the CNT and tune the electrical/electrochemical characteristics, e.g., a donor/acceptor intercalating element would either donate/abstract electron density and could render the CNT negative/positive.

In some implementations, different degrees of order and charge state (e.g., positive for Ar, and neutral with H) can be obtained in CNTs through exposure to H and Ar irradiation. Such correlations may be used further, through the use of a wider range of energies (e.g., as depicted in FIG. 10A) and other process parameters, such as background pressure and flow rate. Our experiments show that hydrogen may be useful for producing a charge-neutral state and argon may be useful for a positive state. Similarly, negative ions (Cl—, F—, O2-, N— etc.) may be used to induce negative charge into the CNTs.

One concern in the fabrication of defects in nanomaterial may be that exposure to hydrogen irradiation, while neutralizing the charged defects, may increase the structural disorder in the sample. However, our experiments show somewhat greater stability of hydrogen exposed CNTs through reduced charging/capacitive currents. To elucidate the impact of ionized atoms or molecules interacting with the CNTs, in order to modulate defect characteristics, the difference between reactive ion introductions vs. heating in diatomic hydrogen needs to be taken into account. In the former process, diatomic hydrogen may undergo decomposition and interact with CNTs to neutralize/saturate dangling bonds, vacancies, etc. However, hydrogen irradiation could also increase CNT disorder which degrades electron transfer kinetics. The extent to which such changes are plausible depends on the power and pressure used during the ion introduction processes. In some designs, powers of the order of 100-300 W under 0.1-100 mTorr pressure would be suitable to probe the range from diatomic hydrogen to dissociated hydrogen.

In this context, it is to be noted that much larger energies, say >100 eV, could result in an excessive number of vacancies/vacancy clusters with significant structural deviation and reduced electrical conductivity. For fabrication of energy storing nanomaterials for applications that use of CNTs as electrodes for supercapacitors, such high irradiation energies, which would decrease the power density, may be avoided.

In some implementations, additive elements such as chlorine may be introduced into the CNTs using a reactive ion chamber. The result of such an addition on the achieved defect density, charge storage capacity and electrode performance, may be different from the corresponding results obtained by using argon irradiation. The size difference between atomic chlorine (~0.1 nm) and argon (~0.158 nm) may also affect the interaction with CNTs, as trapped gases could induce compressive stresses. For example, energy dispersive spectroscopy (EDS) could be used to monitor the amount of chlorine that is intercalated into the CNTs.

In some designs, CNTs may be negatively charged or n-doped through interaction with electropositive elements, e.g., from Group I (Na, K, Cs etc.) and Group II (Be, Mg, Ca, etc.) of the periodic table. The electropositive elements may be useful for enhancing the voltage window, over which electrochemical reactions can occur in electrochemical capacitors, e.g., while a p-type electrode exhibits redox reactions at a positive voltage while for an n-type electrode redox reactions occur at a negative voltage, which may result in increasing the power and energy storage.

It will be appreciated that such charging effects could be manifested in the Raman Spectroscopy of CNTs through a frequency down shift of the G-peak, in comparison to argon where an up shift was seen. In this context, Cs has the lowest ionization energy (~377 kJ/mol) and electro-negativity (Pauling EN~0.79) and may be used in some implementations for doping CNTs. However, the use of Group I elements in aqueous environments may not be efficacious due to their exothermic reaction with water and consequent instability. For example, n-type doping in graphite and CNT samples using K or other Group I elements may be unstable due to ambient humidity. Certain Group II elements—especially Be and Mg, have relatively high ionization energies (>700 kJ/mol), making them less reactive with water but yet reasonably low for them to function as electron donors to CNTs. When Be is used as the additive for generating defects, due to the low vapor pressure (~3.10-10 Pa at 800 K) of Be, its addition to CNTs would not be easy, e.g., the CNTs may have to dipped into molten Be (Tmp~1560 K). The element Mg has a vapor pressure of ~21.5 Pa at 800 K and can be readily evaporated onto the CNT surface. Therefore, in some implementations, Mg may be used to donate electrons to the CNTs due to the electro-negativity difference, between Mg (Pauling EN ~1.31) and carbon (Pauling EN ~2.55). Any Mg residue remaining on the surfacece could be removed through reaction with mild hydrochloric acid without damage to the CNTs, using critical point drying techniques. Note that the electron transfer from the intercalated Mg to the CNTs would not be affected. In some implementations, non-aqueous solvents, such as ionic liquids, may be used to (a) avoid water exposure, and (b) extend the voltage working range in supercapacitors, for enhanced energy densities.

Other practitioners have indicated instability in n-doping. For example, it was shown that nominally n-doped CNTs may be unstable and may revert back to p-type on exposure to the ambient. However, in some implementations, inducing electron carriers to promote n-doping, through either electron donating/hole abstracting organic functional groups may be performed. Concomitantly, the irradiation of CNTs to negative ions, as proposed above, is a novel technique to induce n-doping. Additional defects generated through such processes can also be amenable to increased electron donating organic functional group attachment. Inducing charge through external means may be useful in nanotube electronics where the possibility of p- and n-doping CNTs is desirable for the fabrication of fundamental building blocks such as inverters.

In some implementations, arylation reactions may be used as an efficient way for the functionalization of single walled nanotubes (SWNTs) with greater solubility in organic solvents. Various organic moieties which activate the CNT for electron transfer (e.g., —R, —NH2, -tertbutyl, -dodecyl etc.) and hole transfer (e.g., —OMe, -phenyl, —COOH etc.) can be added onto the CNT.

Figure 11:
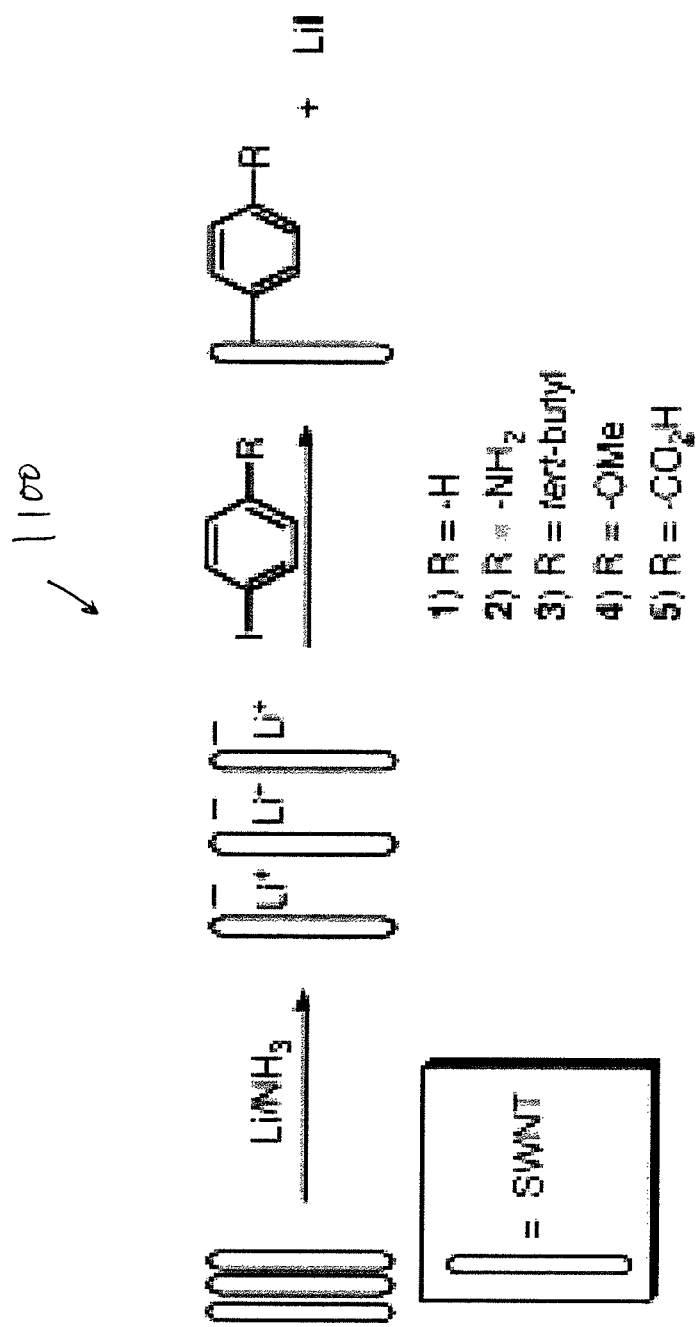
FIG. 11 is a pictorial representation of a process of engineering defects into a single-walled nanotube using an organic additive.

FIG. 11 shows an example of chemical reaction used for functionalizing SWNTs using arylation reactions, with both electron and hole donating groups to introduce various charge states onto the CNTs.

In some implementations, arylation reactions may be carried out by condensing ammonia, followed by Li metal to a flask containing SWNTs. The aryl iodide (R—I) may then be added and the mixture stirred at −33° C., for 12 hours, with the slow evaporation of ammonia. The reaction mixture may then be quenched by slow addition of ethanol followed by water. Subsequently, the mixture may be acidified (10% HCl), filtered, and washed with water and ethanol. The functionalized SWNTs may then be dried overnight in vacuum at 80° C. Subsequent characterization may be done through Raman and infra-red spectroscopy, and Thermogravimetric analyses (TGA). In some implementations, functional groups may be attached in a controlled manner to maintain a precise control of the doping levels in nanotubes.

Figure 12:
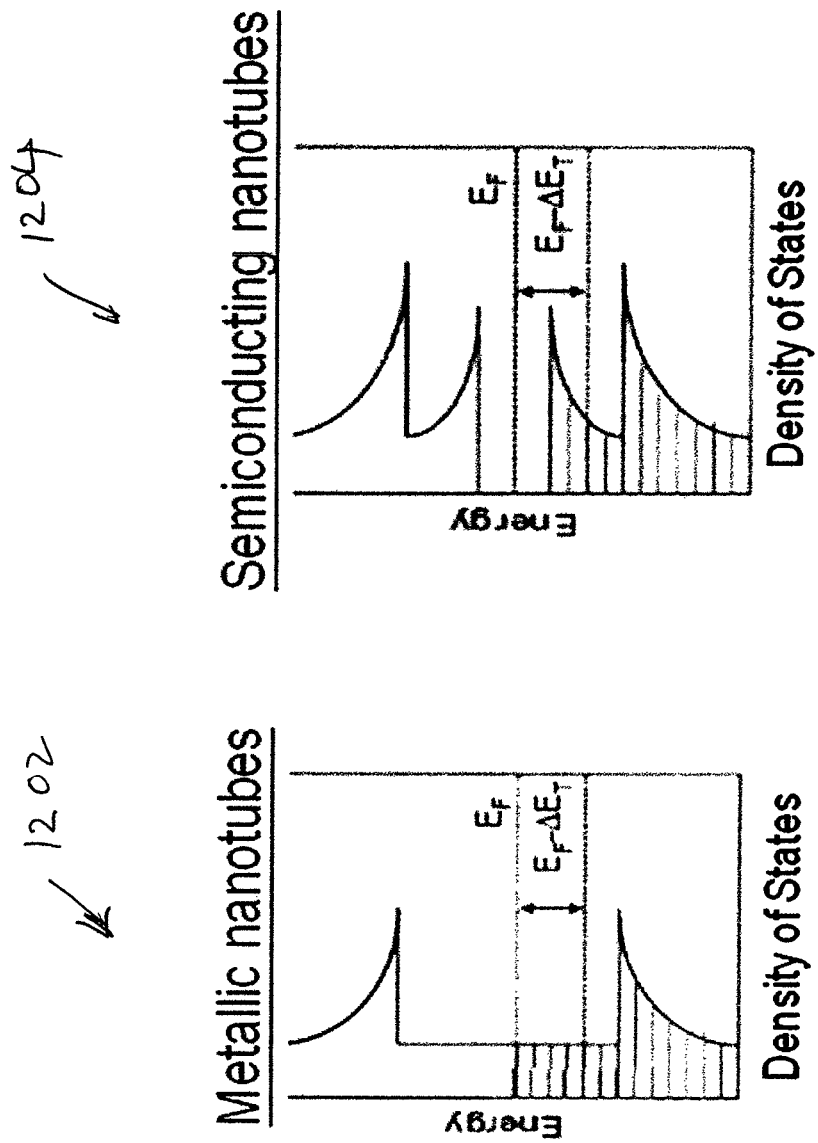
FIG. 12A is a pictorial illustration of energy as a function of density of states for metallic nanotubes.

FIGS. 12A and 12B depicts charts 1202 and 1204 indicating that charge transfer occurs most efficiently when the energy of the adsorbate/organic molecule ($\Delta E_T$) matches the nanotube Fermi energy ($E_F$).

Our experiments have shown that alkyl (dodecyl) chains, which are normally thought to be insulating, were seen to contribute to the electronic transport of carbon nanotubes. Therefore, it may be possible that in some implementations, an electron transfer mechanism, involving hyper-conjugation mediated through the interaction of the σ-electrons of the alkane chains with the σ-electrons of the nanotubes, may be used for the generation of defects in nanomaterials. In some designs, substituent additives such as dodecyl and phenyl may be chosen as additives because these additives have negligible interaction with the metal electrodes. One possible reason may be because the HOMO-LUMO gap may be approximately ~8 eV, with electron affinity ~1 eV, while for dodecyl groups the values are in ~5 eV range. In this context, the possibility of enhanced chemical adsorption, as manifested in the red shift of the SWNT D-peak in Raman spectroscopy, for the dodecyl functionalized SWNTs may be performed in some implementations.

While the electrophilic/nucleophilic character of the functional group can modify the electrical transport, the nature (e.g., work function) of the electrode material can still play a major role. For example, a contact with surface adsorbates could have a larger work function with a reduced Schottky barrier. While the presently disclosed subject matter provides proof of principle for carbon nanotube doping, at the molecular level, through the attachment of organic functional groups, such implementations may be possible for different electrodes and surface treatments.

Raman spectroscopy is an effective tool in probing the nature, influence, and extent of defects and charge transfer. For example, as the CNT deviates from a graphitic structure to lower order nanocrystalline graphite, the (ID/IG) ratio increases, with concomitant upward shift of the G-peak. In our experiments, we have seen how positive (/negative) peak shifts have been associated with charge transfer from (/to) the graphitic CNT lattice. Additionally, the peak width may be proportional to the variation of systemic order—a greater linewidth indicating a greater range of stretching frequencies.

The greater sensitivity of second order Raman peaks to both charge and defects was previously noted. For example, the G' peak (the second harmonic of the D-peak, at ~2700 cm-1) could be used to study and estimate localized doping, where a frequency up shift would be indicative of acceptor-like doping. Additionally, the FWHM of the G' peak would be proportional to the extent of argon incorporation and localized disorder.

Figure 13:
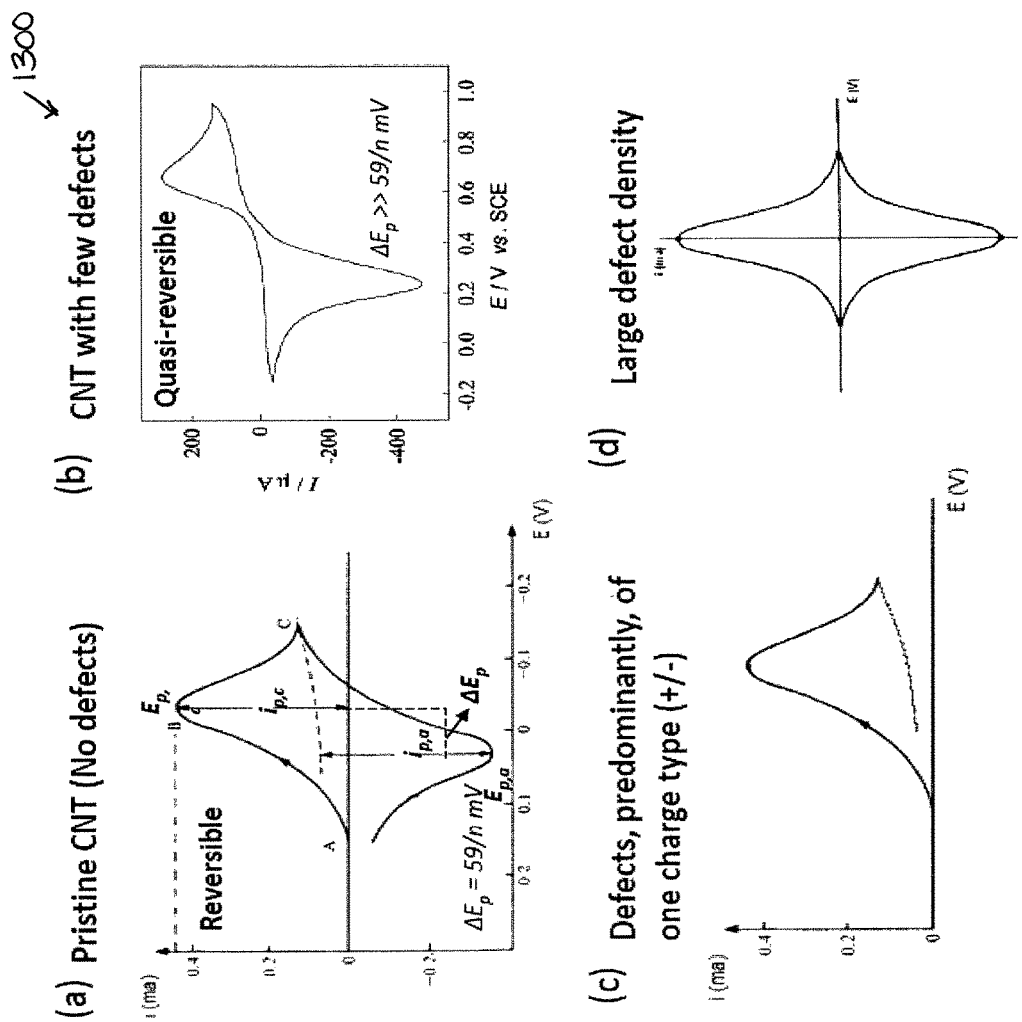
FIG. 13 is a graphical representation of various characteristics of a nanomaterial as a function of applied voltage.

FIG. 13 depicts charts 1300 showing analysis of CNT characteristics through shapes of (I)-voltage (V) curves. These studies are relevant for CNT ensembles and provide information on the overall properties important for supercapacitor applications. Moreover, other issues such as polarizability and reversibility also become apparent. The extent of deviation from reversible characteristics is another metric of the disorder, and be measured through the deviation, (i) from a ratio of one of the anodic and cathodic peak currents, i.e., ($i_{p,a}/i_{p,c}$) and (ii) of the peak potential difference, $\Delta Ep$ (corresponding to the difference of the anode—$E_{p,a}$, and cathode—$E_{p,c}$ peak voltages) from ~59 mV.

FIG. 13A is an illustration of the anodic and cathodic peak currents ($i_{p,a}$ and $i_{p,c}$, respectively) and voltages ($E_{p,a}$ and $E_{p,c}$). A $\Delta Ep$ of 59/n mV, (n is the number of electrons in the redox reaction), is characteristic of defect free CNTs. FIG. 13B illustrates an increased $\Delta Ep$ indicates defective morphology and is manifested through quasi-reversibility. FIG. 13C illustrates the presence of particular charge (+/−) that is indicated through the predominance of one component (say, cathodic, as shown). FIG. 3D shows an enhanced defect density causes $\Delta Ep<59/n$ mV, and for complete adsorption of the electroactive species, $\Delta Ep=0$, as shown.

The above discussed results may be obtained using a standard three electrode setup (FIG. 1A) where the voltages are measured with respect to a standard (standard calomel electrode: SCE), i.e., the electrochemical reaction, Fe(CN)63-+e-↔ Fe(CN)64- that is monitored at the CNT electrodes, to yield information on the defect characteristics, occurs at a fixed voltage. A modification of the electrode setup could be used which yields definitive information on the charge of the CNTs. For example, in a two electrode arrangement, increasing positive charge on the CNT would cause an $E_{p,c}$ shift to increasingly positive voltages while $E_{p,a}$ would move negatively and vice versa.

As previously discussed, in one aspect, CNTs are useful as constituents of electrodes in electrochemical capacitors/supercapacitors due to their large surface area and abundance of reaction sites with the possibility of large charge storage capacity and capacitance (C). Consequently, in an electrolyte where electrochemical reactions can occur over a wide voltage range (V), large energy densities (W) per unit mass (m) can be achieved through $W=CV^2/2m$. While possessing superior power densities (P=W/τ), due to the capability of fast charge/discharge—mainly based on the high electrical conductivity or low resistance, R enabling small discharge times, τ, —presently CNT based supercapacitors have lower energy densities (1-10 Wh/kg) compared to batteries (10-100 Wh/kg) making them less competitive compared to the latter technology.

It should be noted that $C_{dl}$ arises primarily due to charge separation across the electrode/electrolyte interface while $C_p$ requires adsorption of electroactive species coupled with charge transfer. It is therefore possible that the controlled introduction of defects into the CNTs through argon irradiation method could increase both $C_{dl}$ and $C_p$.

Figure 14:
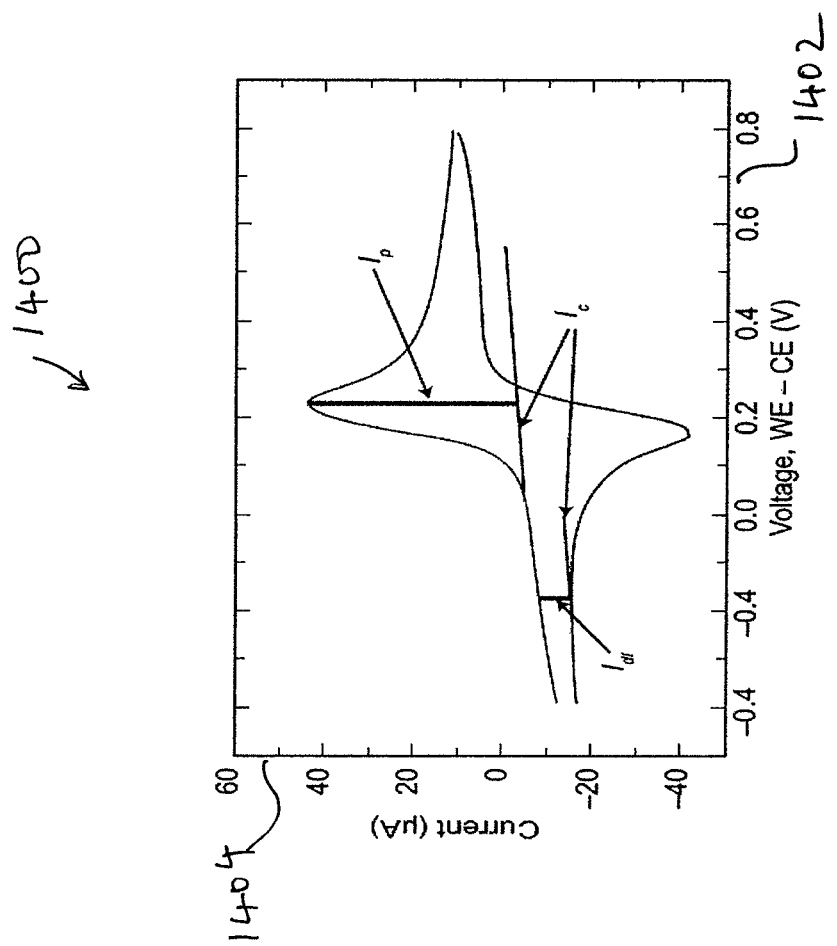
FIG. 14 illustrates current-voltage characteristics of a defect engineered nanomaterial.

FIG. 14 illustrates a graph 1400 of current (axis 1404) as a function of voltage (axis 1402). The analysis of observed current-voltage characteristics can be used to delineate the peak ($I_p$) and double-layer ($I_{dl}$) currents, using a baseline current ($I_C$). Current-voltage graphs such as 1400 may be useful for analyzing electrochemical characteristics of as-prepared and defect tuned CNTs in CV by deconvoluting the total capacitive current IT ($=C_T v$), where v is the scan rate, into contributions from $I_p$ and $I_{dl}$.

For example, in one example procedure, the values of $I_{dl}$ and $I_p$ can be determined by first linearly fitting the current baseline ($I_C$) and then calculating $I_p$ ($=I$ ($E_p$)–$I_C$) and $I_{dl}$ ($=I_{C, cathodic}-I_{C, anodic}$) (FIG. 14), where $E_p$ is the voltage at which the current due to the faradaic reaction is maximum. From the determination of $I_{dl}(=C_{dl}v)$ with a known $v$ we can estimate $C_{dl}$. To understand $C_{dl}$, we will assume that $$C_{dl}\left(=\frac{\varepsilon_o \varepsilon_r A}{L_D}\right)$$

can be modeled through a parallel plate capacitor where $L_D$ is a measure of the diffuse ion layer thickness around the electrode of area A, in an electrolyte with dielectric constant, $\varepsilon_r$. We initially estimate $\varepsilon_r$ as ~80, $\varepsilon_o=8.854\times10^{-12}$ $C^2/Nm^2$, and A as ~100 $m^2/g$ by considering the surface area of each nanotube which is equivalent to treating each CNT as an individual electrode. Assuming coupling between the individual CNTs and taking the projected area of the electrode (~$mm^2$) leads to unrealistically high values for capacitances of the order of $mF/cm^2$ with $L_D$~0.005 nm.

The current due to the pseudo-capacitance, $I_p(=C_p v)$ mainly arises from the faradaic reactions at the CNT surface, e.g., due to redox reactions from adsorbed species such as $Fe(CN)_6^{3-}$ and the $Fe(CN)_6^{4-}$ and can be derived from the cathodic/anodic peak current values. At 298K, $I_p=2.65\cdot10^5$ $n^{1.5}$ $c_i\sqrt{D_o v}=Bc_i\sqrt{v}$ (Randles-Sevcik equation), where $D_o$ (~$6.9\times10^{-6}$ $cm^2/s$) is the diffusion coefficient of the cyanide species, n is the number of electrons transferred (e.g., n=1, in $Fe(CN)_6^{3-}+e^- \leftrightarrow Fe(CN)_6^{4-}$), and B (/B'—see below) is a constant. From $I_T=I_{dl}+I_p$, we deduce that $C_T$ varies with $v$ as:

$$C_T = \frac{B'}{\sqrt{v}} + C_{dl},$$

where $C_p$ varies as $$\frac{1}{\sqrt{v}}$$

and $C_{dl}$ is constant. Plots of $C_T$ vs. $1/\sqrt{v}$ will then be used to extract the individual values of $C_p$ and $C_{dl}$ for both untreated and treated CNTs as a function of scan rate and concentration.

While initial experiments probed a limited parameter range, larger $C_p$ values would also be manifested at smaller scan rates. For a particular CNT treatment (i.e., as synthesized or argon irradiated) $C_p$ may increase with concentration in accordance with the Randles-Sevcik equation. Additionally, large enhancements (>100%) of both $C_p$ and $C_{dl}$ could be expected at any given concentration due to creation of additional electroactive defects/reactive sites. The $C_p$ increase may be correlated to a decreased $L_a$—the Tuinstra-Koenig correlation length to provide a semi-quantitative measure of the defect density relevant for concomitant charge storage. The change of ambient conditions around the electrode, as a function of CNT treatment, can be indicated through a reduced $L_D$ estimated from $C_{dl}$, e.g., it was noted that changes in $C_{dl}$ with concentration ($c_i$) could be due to the Debye length $$\left(\kappa \sim \sqrt{\frac{\varepsilon_o \varepsilon_r k_B T}{2 c_i n^2 e^2}}\right)$$

variation, where $\kappa$ is related to $L_D$. Therefore, more reactive sites would allow for greater ion concentration, around the electrode, with correspondingly enhanced charge.

Figure 15:
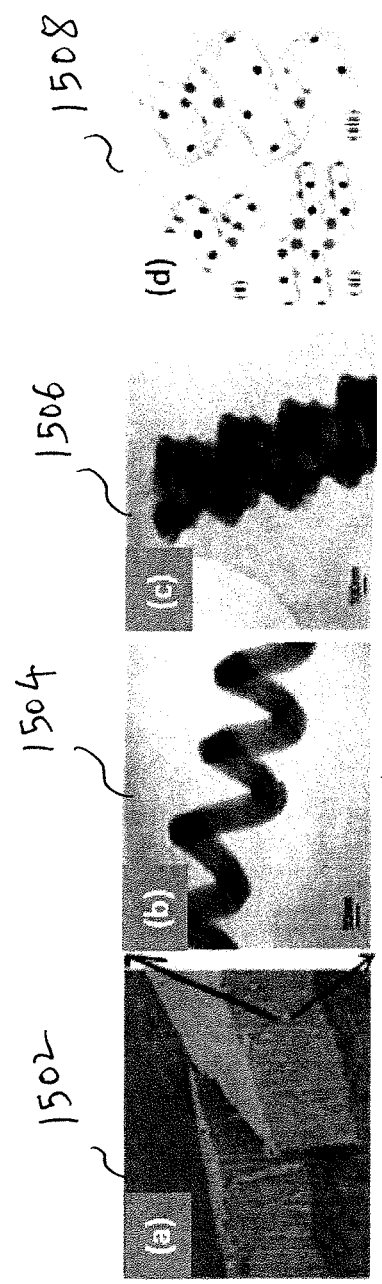
FIG. 15 depicts example nonlinear nanomaterials.

With reference to FIG. 15, in some implementations, helical or chiral CNT structures on a large scale (1502) may be used. In some implementations, tubular structures (1504) or wire like morphologies (1506) may be used. These nanostructures may have pentagonal and heptagonal defects (1508) which correspond to an excess/deficit of charge. The structures 1502, 1504, 1506 and 1508 could be engineered to correspond to a sequence of alternating metallic and semiconducting junctions with novel non-linear behavior and be practically used for sensors and other electronic devices.

As discussed, the structure 1502 may be a highly aligned coiled CNT array with nearly identical diameter and pitch. The structure 1504 may be tubular and the structure 1506 may have wire-like form. The structure 1508 may represent energetically favored helical CNT forms based on (i) C360, (ii) C1080, and (iii) C540 structures with pentagonal and heptagonal defects.

Figure 16:
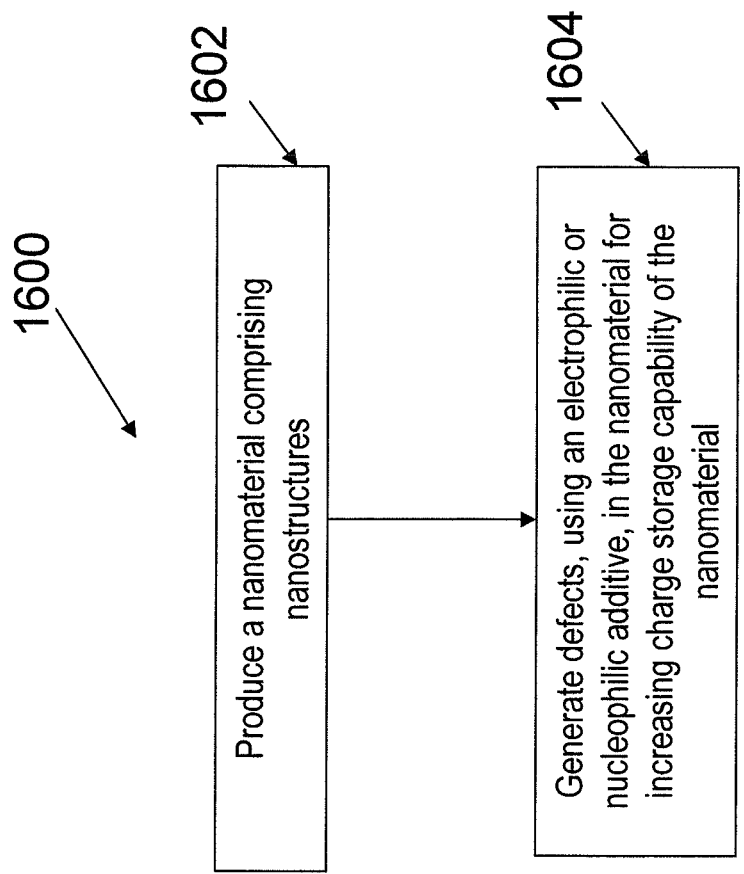
FIG. 16 is a flow chart representation of a process for fabricating an energy storage device.

FIG. 16 is a flow chart representation of a process 1600 of fabricating an energy storage device. At 1602, a nanomaterial comprising nanostructures is produced. At 1604, defects are generated in the nanomaterial, using an electrophilic or nucleophilic additive for increasing charge storage capability of the nanomaterial. In some implementations, at 1604, defects may be generated using gaseous additives. For example, in some implementations, gaseous additives such as $H_2$, Argon, $Cl_2$, $BCl_3$, $CF_4$ are used. In some implementations, at 1604, organic additives, as previously discussed, are used to generate the defects in nanomaterials. In some implementations, the nanostructures may comprise at least one of carbon nanotubes, carbon nanofibers and semiconductor nanowires. In some implementations, as previously discussed, the nanostructures may include helical or chiral nanotubes or nanofibers.

In some implementations, the nanomaterial fabricated using process 1600 may be deposited on a first conductive surface of a first electrode. The nanomaterial may also be deposited on a second surface of a second electrode. A first spacer may be provided. The first spacer may be positioned in close proximity of the first electrode. The first spacer may include an electron-insulating material. In addition, a second spacer, positioned in close proximity of the second electrode and comprising an electron-insulating material may be provided. A separator comprising porous membrane may be positioned between the first spacer and the second spacer.

Figure 17:
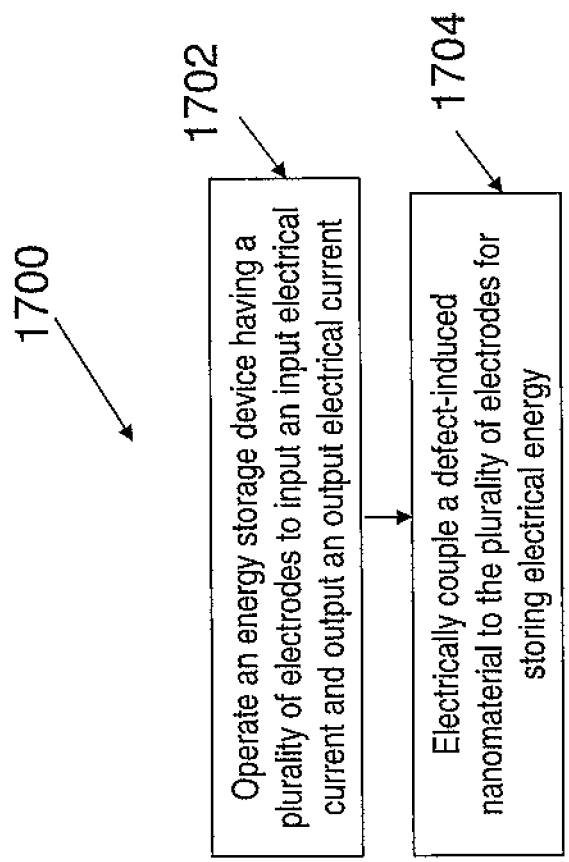
FIG. 17 is a flow chart representation of a process for controlling input electrical resistance of an energy storage device.

FIG. 17 is a flow chart representation of a process 1700 of operating an energy storage device. At 1702, an energy storage device having a plurality of electrodes is operated to input an input electrical current and output an output electrical current. For example, the electrodes may be provided to have a configuration as described with respect to FIG. 3 of FIG. 4. At 1704, a defect-engineered nanomaterial is electrically coupled to the plurality of electrodes for storing electrical energy. The level of defects is controlled by an additive used during fabrication of the nanomaterial so that the level of defects in the defect-engineered nanomaterial is a function of a desired input electrical impedance of the energy storage device. The functional relationship between input impedance and density of engineered defects has been previously discussed in this patent document. As previously discussed, the level of defects may be controlled using an additive used during the fabrication of the nanomaterial.

The defects engineered in the process 1700 may comprise electrically charged defects. In some implementations, the electrically charged defects may be negatively charged defects. In some implementations, the defects include electrically neutral defects. The nanostructures used may comprise carbon nanotubes, carbon nanofibers or semiconductor (e.g., silicon) nanowires. In some implementations, the nanostructures may comprise nonlinear (e.g., helical or chiral) nanostructures.

Figure 18:
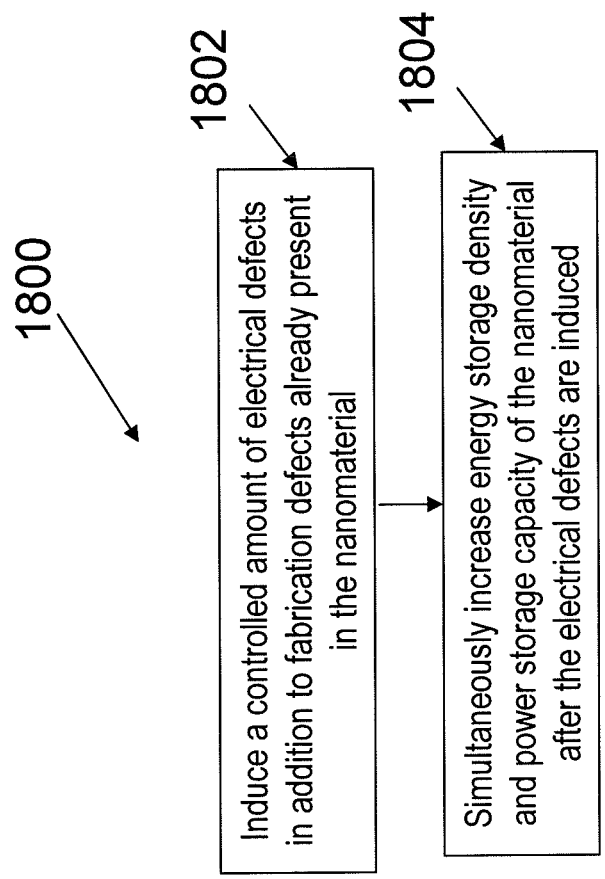
FIG. 18 is a flow chart representation of a process for fabricating engineering additional defects in a nanomaterial having fabrication defect.

FIG. 18 is a flow chart representation of a process 1800 of inducing additional defects in a nanomaterial having fabrication defects. At 1802, a controlled amount of electrical defects are engineered into the nanomaterial. These engineered defects may be in addition to the fabrication defects already present in the nanomaterial. Inducing the additional defects is performed to simultaneously increase energy storage density and power storage capacity of the nanomaterial, after the defects are engineered. The defects may be engineered using one of previously described techniques such as irradiation using Argon or by using an organic, gaseous, electrophilic or nucleophilic or another additive.

In some implementation, the energy storage devices disclosed in this patent document may be scaled up for applications such as grid scale energy storage. In one aspect, the presently disclosed capacitor based energy storage is easily tunable to alter the response time, which can be optimized for a given capacitance and resistance. The constituent capacitance of the DCN based capacitors can be tuned, and cycled rapidly, over a wide range (see Table V below)) and scale, through the controlled introduction of ionized species.

For example, in some implementations, capacitance of the energy storage device (e.g., device 300 or 400) can be tuned from 1 $\mu F/cm^2$—pure double layer capacitance, to 1000 $\mu F/cm^2$—enhanced pseudo-capacitance, through the induction of defects through ion irradiation. Multi-walled carbon nanotubes of ~20 nm diameter and capacitor series resistance of 1 mOhm have been assumed.

TABLE V

| | C ($\mu F/cm^2$) | Time for grid charge/ discharge (seconds) | Grid support Application |
|---|---|---|---|
| Increased defect density | 1 | 1 | Frequency stabilization |
| | 10 | 10 | Voltage regulation |
| | 100 | 100 | Power smoothing |
| | 1000 | 1000 | Energy shifting |

The use of higher energies would allow for deeper implantation of the ionized species and also allow for larger scale assembly. These aspects then directly translate to solving the problems in variability inherent to renewable energy generation. In some implementations, a negligible (<1%) loss in the capacitance characteristics over 100 cycles, relative to the initial values, is possible. Therefore, scaled-up versions of such capacitors, through the use of capacitor device banks, may be used for power grid support applications.

In some implementations, the energy storage devices disclosed in this patent document may be used for storage of solar energy.

It will be appreciated that multiple benefits on energy storage accrue to end users, local distribution utilities and regional system operators. Transmission and distribution (T&D) value streams include voltage support, grid stability, and deferred investment, reduced outages, and reduced losses. In addition, storage can benefit from participation in the deregulated markets providing regulation, spinning reserves, ramp, black start, and energy arbitrage. The advanced energy storage (AES) market is conservatively estimated to be 2-3 GW for California in the near term and could grow to 10-12 GW over the next 5 years. There is also a need for a four hour time shift of non-coincident photovoltaic electric generation in much of the Western United States, necessitating energy storage systems to improve use of renewable energy and to support electric utility grid management. Conventional capacitors are widely used for power quality regulation and consequently capacitors using defect-engineered nanomaterials could see rapid market penetration due to the familiarity of power grid engineers with the basic technology.

Figure 19:
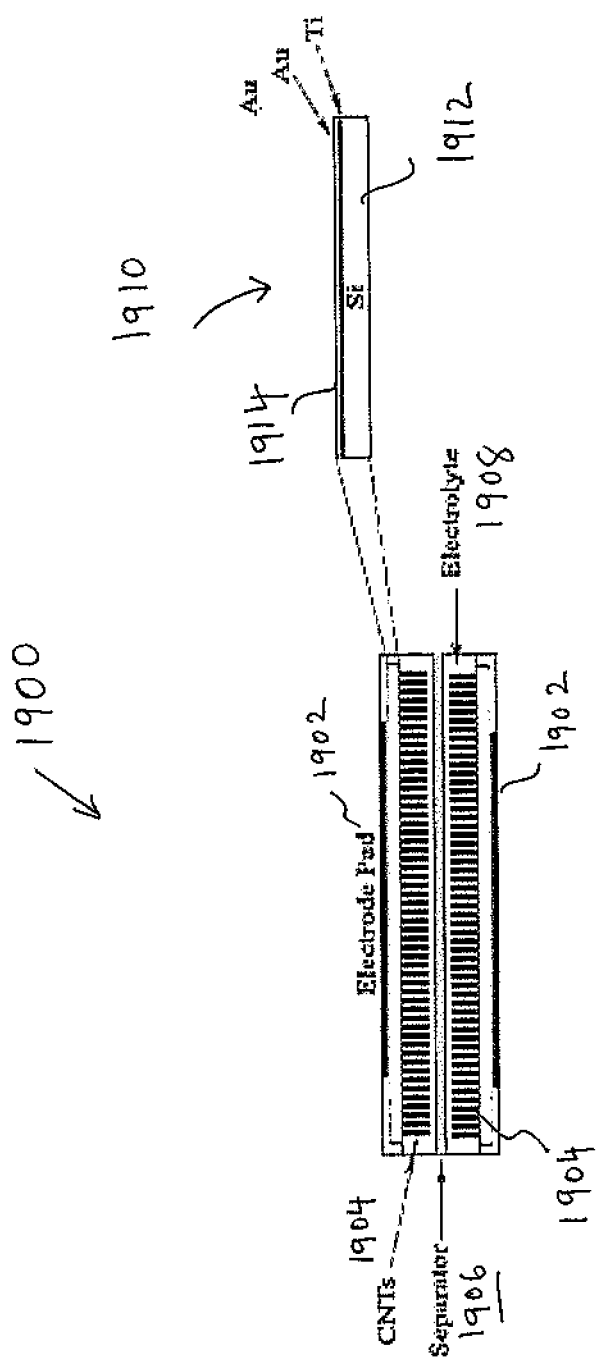
FIG. 19 is a cross-sectional side view of an electrochemical capacitor device, using defect-engineered CNTs.

FIG. 19 depicts a block diagram representation of an electrochemical capacitor device 1900 using the proposed defect tuned carbon nanotube (CNT) materials 1904. The CNTs 1904 are positioned between parallelly separated electrode pads 1902 and separated by a separator 1906. The separator 1906 and the CNTs 1904 are immersed into electrolyte 1908. As depicted in a blow-up 1910, the CNTs 1904 may be coupled to the electrode pads 1902 using a silicon semiconductor spacer 1912 (e.g., silicon spacer), having a layer of highly conductive material such as Au, or Au/Ti alloy 1914 deposited on the surface on the electrode pad 1902 side. Either aqueous or non-aqueous electrolytes (e.g., ionic liquids) may be used, both for extending the voltage range of an element beyond ~1.2 V and for safety reasons. As previously discussed with respect to FIGS. 3 and 4, various separating membranes, e.g., cellulose-based, Teflon-based, polypropylene (PP)-based, and polyethylene (PE)-based films, are possible, suitable for a given electrolyte 1908, used to prevent leakage currents.

Figure 20:
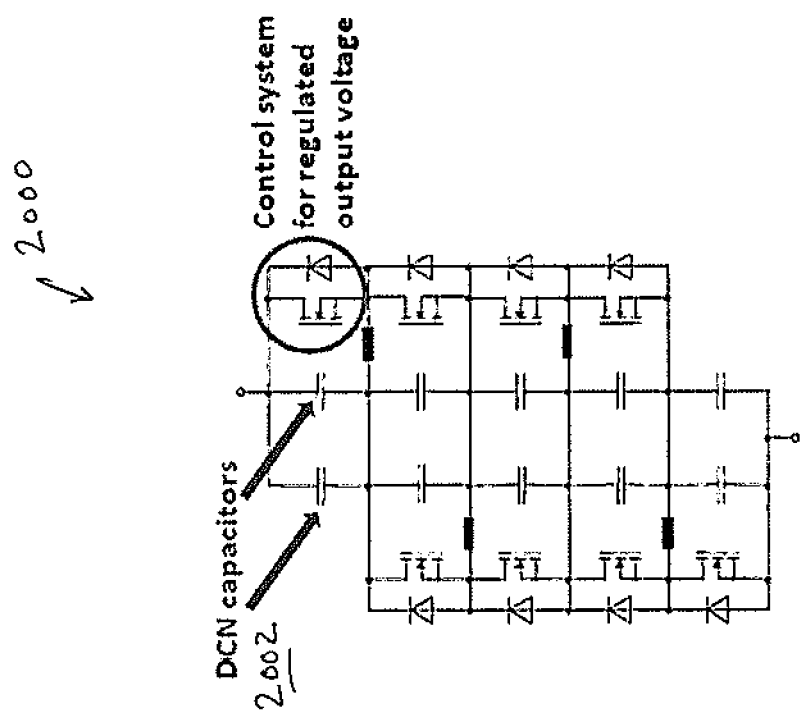
FIG. 20 is an example of a circuit used for capacitive energy storage using energy storage devices including a defect-engineered nanomaterial.

FIG. 20 is a circuit diagram 2000 showing an exemplary connection of defect-engineered energy storage devices for capacitive energy storage. As depicted, defect-engineered nanotube (DCN) capacitors may be coupled in series to supply large voltage at "full load" status for power grid storage applications. However, in some implementations, as depicted, parallel connections may be utilized to create capacitor banks for equalizing capacitor values by taking into account variations in individual capacitor values.

In one aspect, the capacitors produced using defect-engineered nanomaterials have the advantages of shallow and deep cycling in charge and discharge cycles.

It will be appreciated that various techniques are disclosed for inducing defects in nanomaterials. In one aspect, the engineered defects are engineered to cause an increase in the energy storage capacity and/or power storage density of the nanomaterial.

Furthermore, energy storage apparatuses that use defect-engineered nanomaterial are discloses. In one example, two electrodes include defect-engineered nanomaterial deposited on the electrodes, separated by spacers and a separator.

In addition, several possible additives are disclosed for engineering defects into nanomaterials. Such defects may be electrically neutral, negative or positive. The additives may include gaseous elements or compounds that may be electrophilic or nucleophilic, as desired. The additives may comprise organic molecules that induce negatively charged (or positively charged) defects in the nanomaterial.

It will also be appreciated that while several embodiments are discloses with specific reference to carbon nanotubes, similar techniques are useful for nanomaterial comprising carbon nanofibers or semiconductor (e.g., silicon) nanowires.

In addition, the use of nonlinear nanomaterials such as helical of chiral structures, is disclosed for inducing defects into, causing improvement in energy storage capacity of such nanomaterials.

In one aspect, the disclosed techniques may be useful in producing an electrical energy storage device that has a relatively high power density (i.e., faster charge time) and a relatively high energy storage capacity, when compared with present art batteries (e.g. alkaline batteries). In another aspect, experimental results that show that multiple charging/discharging cycles does not produce additional detrimental effects in defect-engineered nanomaterials, when compared with "as prepared" nanomaterials, have been presented.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this application.

What is claimed is:

1. A method of fabricating an energy storage device, the method comprising:
   producing a nanomaterial comprising nanostructures;
   generating defects, using an electrophilic or nucleophilic additive, in the nanomaterial for increasing charge storage capability of the nanomaterial, further comprising:
   depositing the nanomaterial on a first conductive surface of a first electrode;
   depositing the nanomaterial on a second conductive surface of a second electrode;
   providing a first spacer positioned in close proximity of the first electrode, the first spacer comprising an electron-insulating material;
   providing a second spacer positioned in close proximity of the second electrode, the second spacer comprising the electron-insulating material; and
   providing a separator positioned between the first spacer and the second spacer, the separator comprising a porous membrane.

2. The method recited in claim 1, wherein the process of generating defects comprises generating defects using a gaseous additive.

3. The method recited in claim 1, wherein the process of generating defects comprises generating defects using an organic additive.

4. The method recited in claim 1, wherein the nanostructures comprise at least one of carbon nanotubes, carbon nanofibers and semiconductor nanowires.

5. The method recited in claim 1, wherein the nanostructures comprise helical nanotube or nanofibers.

6. A method of operating an energy storage device, the method comprising:
   operating an energy storage device having a plurality of electrodes to input an input electrical current and output an output electrical current; and
   electrically coupling a defect-engineered nanomaterial to the plurality of electrodes for storing electrical energy, wherein a level of defects is controlled by an additive so that the level of defects in the defect-engineered nanomaterial is a function of a desired input electrical impedance of the energy storage device.

7. The method of claim 6, wherein the defects comprise electrically charged defects.

8. The method of claim 7, wherein the electrically charged defects comprise negatively charged defects.

9. The method of claim 6, wherein the defects comprise electrically neutral defects.

10. The method of claim 6, wherein the nanostructures comprise carbon nanotubes or carbon nanofibers.

11. The method of claim 6, wherein the nanostructures comprise semiconductor nanowires.

12. The method of claim 6, wherein the nanostructures comprise nonlinear nanostructures.

13. A method of controlling input electrical resistance of an energy storage device, the method comprising:
   providing the energy storage device with a plurality of electrodes for inputting and outputting electrical current; and
   providing a defect-induced nanomaterial, electrically coupled to the plurality of electrodes, for storing electrical energy;
   wherein a level of defects in the defect-induced nanomaterial is a function of a desired input electrical impedance of the energy storage device, and wherein the level of defects is controlled by an additive.

14. The method of claim 13, wherein the defects comprise electrically charged defects.

15. The method of claim 14, wherein the electrically charged defects comprise negatively charged defects.

16. The method of claim 13, wherein the defects comprise electrically neutral defects.

17. The method of claim 13, wherein the nanostructures comprise carbon nanotubes or carbon nanofibers.

18. The method of claim 13, wherein the nanostructures comprise semiconductor nanowires.

19. The method of claim 13, wherein the nanostructures comprise nonlinear nanostructures.

* * * * *